US012133574B2

(12) United States Patent
Livne et al.

(10) Patent No.: US 12,133,574 B2
(45) Date of Patent: Nov. 5, 2024

(54) FOOTWEAR WITH A MOVABLE PROTUBERANCE AND AN OUTSOLE MAP FOR PROTUBERANCE POSITIONING

(71) Applicant: APOS MEDICAL ASSETS LTD., Tel Aviv (IL)

(72) Inventors: Oren Livne, Tel Aviv (IL); Yaakov Shmuel Gottlieb, New York, NY (US)

(73) Assignee: APOS MEDICAL ASSETS LTD., Tel Aviv (IL)

( * ) Notice: Subject to any disclaimer, the term of this patent is extended or adjusted under 35 U.S.C. 154(b) by 453 days.

(21) Appl. No.: 17/312,603

(22) PCT Filed: Dec. 12, 2019

(86) PCT No.: PCT/IL2019/051367
§ 371 (c)(1),
(2) Date: Jun. 10, 2021

(87) PCT Pub. No.: WO2020/121314
PCT Pub. Date: Jun. 18, 2020

(65) Prior Publication Data

US 2022/0039515 A1 Feb. 10, 2022

Related U.S. Application Data

(60) Provisional application No. 62/779,055, filed on Dec. 13, 2018.

(51) Int. Cl.
*A43B 3/00* (2022.01)
*A43B 7/1425* (2022.01)
(Continued)

(52) U.S. Cl.
CPC .......... *A43B 7/1464* (2022.01); *A43B 3/0036* (2013.01); *A43B 7/1425* (2013.01);
(Continued)

(58) Field of Classification Search
CPC ..... A43B 13/145; A43B 13/143; A43B 3/006; A43B 3/0042; A43B 7/145; A43B 7/144;
(Continued)

(56) References Cited

U.S. PATENT DOCUMENTS 2,095,488 A * 10/1937 Cobb .................. A43B 23/227 36/149
2,413,133 A * 12/1946 John .................. A61H 1/0266 601/97

(Continued)

FOREIGN PATENT DOCUMENTS

CN 108741393 A 11/2018

OTHER PUBLICATIONS

PCT Search Report for International Application No. PCT/IL2019/051367 mailed Mar. 26, 2020, 3 pp.

(Continued)

*Primary Examiner* — Heather Mangine
(74) *Attorney, Agent, or Firm* — The Roy Gross Law Firm, LLC; Roy Gross

(57) ABSTRACT

A footwear, including an outsole including an anterior portion and a posterior portion wherein at least one of the anterior portion and the posterior portion are configured to receive at least one protuberance, the outsole including a visible outsole map including at least one of an anterior portion outsole map and a posterior portion outsole map, each including different outsole coordinate systems, and at least one protuberance movably mountable on the outsole and configured to contact the ground and including at least one visible protuberance coordinate system corresponding to the outsole map, wherein each of the reference points on the outsole map represents a unique protuberance alignment setting in respect to the outsole map.

9 Claims, 30 Drawing Sheets

(51) Int. Cl.

| | |
|---|---|
| ***A43B 7/144*** | (2022.01) |
| ***A43B 7/1464*** | (2022.01) |
| ***A43B 7/1469*** | (2022.01) |
| ***A43B 13/14*** | (2006.01) |
| ***A61H 1/02*** | (2006.01) |

(52) U.S. Cl.

CPC ............ *A43B 7/144* (2013.01); *A43B 7/1469* (2022.01); *A43B 13/145* (2013.01); *A61H 1/0266* (2013.01)

(58) Field of Classification Search

CPC ... A43B 7/1425; A43B 7/1405; A43B 7/1455; A43B 7/1464; A43B 7/1466; A43B 7/1469; A43B 7/1463; A43B 7/1467; A43B 7/1468; A43B 7/19; A61H 1/0266

See application file for complete search history.

(56) References Cited

U.S. PATENT DOCUMENTS

| | | | | |
|---|---|---|---|---|
| 4,109,661 | A * | 8/1978 | Fukuoka | A43B 7/145 36/141 |
| 4,577,417 | A * | 3/1986 | Cole | A43B 13/203 36/28 |
| 4,821,432 | A * | 4/1989 | Reiber | A43B 7/1464 36/110 |
| 5,170,776 | A * | 12/1992 | Pecheux | A61H 1/0266 601/87 |
| 5,643,164 | A * | 7/1997 | Teff | A63B 23/08 482/79 |
| 6,979,287 | B2 * | 12/2005 | Elbaz | A63B 21/0004 482/148 |
| 7,101,330 | B2 | 9/2006 | Elbaz et al. | |
| 7,266,912 | B2 * | 9/2007 | Whatley | A43B 13/145 482/79 |
| 7,462,158 | B2 | 12/2008 | Mor | |
| 8,038,583 | B2 | 10/2011 | Bailar | |
| 8,533,980 | B2 | 9/2013 | Elbaz et al. | |
| 8,758,207 | B2 | 6/2014 | Elbaz et al. | |
| 9,055,788 | B2 | 6/2015 | Elbaz et al. | |
| 9,271,895 | B2 | 3/2016 | Mor et al. | |
| 9,357,812 | B2 * | 6/2016 | Elbaz | A43B 7/14 |
| 9,445,965 | B2 | 9/2016 | Mor et al. | |
| 9,693,927 | B2 | 7/2017 | Mor et al. | |
| 9,788,597 | B2 | 10/2017 | Elbaz et al. | |
| 9,861,509 | B2 * | 1/2018 | Elbaz | A43B 7/146 |
| 10,010,743 | B2 | 7/2018 | Elbaz et al. | |
| 10,632,006 | B2 | 4/2020 | Elbaz et al. | |
| 10,744,368 | B2 | 8/2020 | Elbaz et al. | |
| 10,750,812 | B2 | 8/2020 | Mor et al. | |
| 11,219,574 | B2 | 1/2022 | Depta | |
| 11,504,571 | B2 * | 11/2022 | Elbaz | A43B 5/00 |
| 11,589,646 | B1 * | 2/2023 | Weschler | A43B 5/12 |
| 2003/0056394 | A1 * | 3/2003 | Yu | A43B 3/0042 36/8.3 |
| 2004/0033874 | A1 | 2/2004 | Elbaz et al. | |
| 2005/0246924 | A1 * | 11/2005 | Masoodifar | A43B 13/148 36/132 |
| 2009/0113760 | A1 * | 5/2009 | Dominguez | A43B 13/145 36/102 |
| 2009/0193687 | A1 * | 8/2009 | Kim | A43B 17/00 482/79 |
| 2010/0050476 | A1 * | 3/2010 | Elbaz | A43C 19/00 36/103 |
| 2010/0236094 | A1 * | 9/2010 | Ryu | A43B 7/24 36/28 |
| 2010/0236095 | A1 * | 9/2010 | Reed | A43B 13/14 36/28 |
| 2010/0251567 | A1 | 10/2010 | McInnis et al. | |
| 2011/0009982 | A1 * | 1/2011 | King | A61H 3/00 623/53 |
| 2011/0123099 | A1 | 5/2011 | Pfeiffer et al. | |
| 2011/0126422 | A1 * | 6/2011 | Vattes | A43B 13/145 36/28 |
| 2012/0073166 | A1 * | 3/2012 | Bryla | A43B 7/1455 36/132 |
| 2012/0227288 | A1 * | 9/2012 | Teteriatnikov | A43B 3/0042 36/136 |
| 2013/0055597 | A1 * | 3/2013 | Hennig | A43B 7/00 434/258 |
| 2014/0149072 | A1 | 5/2014 | Rutschmann | |
| 2018/0168279 | A1 * | 6/2018 | Mor | A61H 23/02 |
| 2018/0178067 | A1 | 6/2018 | Rousian | |
| 2018/0220737 | A1 * | 8/2018 | Piontkowski | A43B 17/023 |
| 2019/0053567 | A1 * | 2/2019 | Thomas | A43B 3/0036 |
| 2019/0069630 | A1 * | 3/2019 | Hopkins | A43B 13/141 |
| 2019/0110918 | A1 * | 4/2019 | Darby, II | A43B 23/08 |
| 2019/0275403 | A1 * | 9/2019 | Rudan | A63B 21/4037 |
| 2020/0011658 | A1 | 1/2020 | Chuyko et al. | |
| 2020/0093675 | A1 * | 3/2020 | Hale | A61H 1/0266 |
| 2020/0230014 | A1 * | 7/2020 | Kim | B25J 9/0006 |
| 2020/0359737 | A1 * | 11/2020 | Sung | A43B 13/181 |
| 2020/0375302 | A1 | 12/2020 | Mor et al. | |
| 2020/0376323 | A1 | 12/2020 | Elbaz et al. | |
| 2022/0022595 | A1 * | 1/2022 | Girard | A43B 13/122 |
| 2022/0039515 | A1 * | 2/2022 | Livne | A43B 7/144 |
| 2022/0361628 | A1 * | 11/2022 | Natanson | A43D 1/00 |
| 2023/0029846 | A1 * | 2/2023 | Livne | A43B 13/122 |
| 2023/0140074 | A1 * | 5/2023 | Bernhard | A43B 13/187 36/28 |
| 2023/0232934 | A1 * | 7/2023 | Lightheart | A43B 13/145 36/114 |

OTHER PUBLICATIONS

PCT Written Opinion for International Application No. PCT/IL2019/051367 mailed Mar. 26, 2020, 6 pp.

M. Khajehei and F. Etemady, “Data Mining and Medical Research Studies,” 2010 Second International Conference on Computational Intelligence, Modelling and Simulation, 2010, pp. 119-122.

A. Anguera, J.M. Barreiro, J.A. Lara, D. Lizcano, “Applying data mining techniques to medical time series: an empirical case study in electroencephalography and stabilometry”. Computational and Structural Biotechnology Journal, vol. 14, 2016, pp. 185-199, ISSN 2001-0370.

* cited by examiner

| OBJECTIVE | POD LOCATION AL=ANTERIOR LEFT, PL=POSTERIOR LEFT, AR=ANTERIOR RIGHT PR=POSTERIOR RIGHT | PCP postion in respect to center rail line (axis Y) (P=POSTERIOR/ (A=ANTERIOR) | POD POINTER NUMBER | ALIGNMENT LINE |
|---|---|---|---|---|
| 1 | AL | P | 0 | L8-L1 |
| | | | 1 | |
| | | | 2 | 0 |
| | | A | 3 | |
| | | | 4 | |
| | | | 5 | M1-M8 |

| | POD LOCATION | PCP position in respect to Center rail line (axis X) (L=LATERAL/ M=MEDIAL) | ALIGNMENT LINE | SCALE |
|---|---|---|---|---|
| 2 | PL | L | M1-L5 | (+2) |
| | | | | (+1) |
| | | | | (0) |
| | | | | (-1) |
| | | M | | (-2) |
| | | | | (-3) |
| | | | | (-4) |
| | | | | (-5) |

FIG.17A (Continued in fig. 17B)

| | POD LOCATION AL=ANTERIOR LEFT, PL=POSTERIOR LEFT, AR=ANTERIOR RIGHT PR=POSTERIOR RIGHT | PCP postion in respect to center rail line (axis Y) (P=POSTERIOR/ (A=ANTERIOR) | POD POINTER NUMBER | ALIGNMENT LINE |
|---|---|---|---|---|
| 3 | AR | P | 0 | L8-L1 |
| | | | 1 | |
| | | | 2 | 0 |
| | | A | 3 | |
| | | | 4 | |
| | | | 5 | M1-M8 |

| | POD LOCATION | PCP position in respect to Center rail line (axis X) (L=LATERAL/ M=MEDIAL) | ALIGNMENT LINE | SCALE |
|---|---|---|---|---|
| 4 | PR | L | M1-L5 | (+2) |
| | | | | (+1) |
| | | | | (0) |
| | | | | (-1) |
| | | M | | (-2) |
| | | | | (-3) |
| | | | | (-4) |
| | | | | (-5) |

FIG.17B (Continued from fig. 17A)

| CRONOLOGICAL READING ORDER | 1 | 8 | 9 | 10 |
|---|---|---|---|---|
| OBJECTIVE | POD LOCATION | PCP POSITION IN RESPECT TO CENTER LINE | POD POINTER No. | ALIGNMENT LINE |
| example of a CODE LINE | AL | P | 2 | L6 |

FIG. 17C

FOOTWEAR WITH A MOVABLE PROTUBERANCE AND AN OUTSOLE MAP FOR PROTUBERANCE POSITIONING

CROSS REFERENCE TO RELATED APPLICATIONS

This application is a National Phase of PCT Patent Application No. PCT/IL2019/051367 having International filing date of Dec. 12, 2019 entitled "MAP FOR FOOTWEAR", which claims the benefit of priority under 35 USC § 119(e) of U.S. Provisional Patent Application No. 62/779,055 filed Dec. 13, 2018 entitled "MAP FOR FOOTWEAR". The contents of the above applications are all incorporated by reference as if fully set forth herein in their entirety.

FIELD OF THE INVENTION

The present invention, in some embodiments thereof, relates to footwear, and more particularly, but not exclusively, to a footwear for training, developing and enhancing proprioceptive and kinesthetic skills and neuromuscular control.

BACKGROUND OF THE INVENTION

Proprioception refers to the ability to know where a body part is located in space and to recognize movements of body parts (such as fingers and toes, feet and hands, legs and arms). Kinesthesia is a related term, and refers to the sensation by which position, weight, muscle tension and movement are perceived. In some of the medical literature, proprioception refers to the conscious and unconscious appreciation of joint position, while kinesthesia refers to the sensation of joint velocity and acceleration. Proprioception is often used inter-changeably with kinesthesia, and herein as well, the terms will be used interchangeably.

U.S. Pat. No. 6,979,287 to Elbaz and Mor describes novel proprioceptive and kinesthetic exercise apparatus, which provides significant advantages over other prior art apparatus, such as tilt boards or shoes with a single protrusion. The apparatus includes two bulbous protrusions protruding from the underside of footwear, instead of the single ball of the prior art boards and shoes. One of the protuberances is positioned more posteriorly than the other protuberance. The extra protrusion may significantly increase the possibilities and enable walking and accelerate and improve the results of proprioceptive and kinesthetic treatment plans.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in accordance with some embodiments, a footwear, including an outsole including an anterior portion and a posterior portion wherein at least one of the anterior portion and the posterior portion are configured to receive at least one protuberance, the outsole including a visible outsole map including at least one of an anterior portion outsole map and a posterior portion outsole map, each including different outsole coordinate systems, and at least one protuberance movably mountable on the outsole and configured to contact the ground and including at least one visible protuberance coordinate system corresponding to the outsole map, wherein each of the reference points on the outsole map represents a unique protuberance alignment setting in respect to the outsole map.

In some embodiments, each of the reference points on the map represents a discrete protuberance setting in respect to the outsole map. In some embodiments, the protuberance has more than one degree of freedom of movement. In some embodiments, the outsole map includes marks of lines and/or numbers. In some embodiments, the outsole map includes discrete points visually suggestive as having arbitrary distribution. In some embodiments, the protuberance is coupled to the outsole by a sliding hinge.

In some embodiments, the protuberance includes a protuberance pivot. In some embodiments, the protuberance coordinate system includes at least one alignment line colinear with a diameter of the protuberance. In some embodiments, the angles between two consecutive pairs of alignment lines are different. In some embodiments, only one alignment line aligns with the outsole map at a time. In some embodiments, the at least one alignment line includes a pair of collinear pointers which are alignable with the outsole map. In some embodiments, the protuberance coordinate system includes a lateral side and a medial side with respect to the outsole.

In some embodiments, the protuberance coordinate system includes at least one anterior pointer which aligns the coordinate system with the outsole map. In some embodiments, the protuberance coordinate system includes at least one posterior pointer which aligns the protuberance with the posterior outsole map. In some embodiments, at least one alignment line crosses the protuberance pivot and includes a first pointer and a second pointer such that the distance between the first pointer and the protuberance pivot is larger than the distance from the second pointer and the protuberance pivot.

In some embodiments, at least one of the anterior outsole map and the posterior outsole map includes a plurality of anterior longitudinal lines and posterior longitudinal lines. In some embodiments, the anterior portion of the outsole includes an anterior rail configured to couple to a protuberance. In some embodiments, the anterior rail includes an anterior rail midline, and the anterior rail is positioned along the outsole such that the angle between the anterior longitudinal lines and the anterior rail midline between 25-150 degrees. In some embodiments, a coordinate system of the anterior outsole map includes an anterior origin point positioned such that the anterior origin includes the intersection of the anterior rail midline and one of the anterior longitudinal lines.

In some embodiments, coordinate points of the outsole map and/or outsole coordinate systems are marked on the outsole in the form of a plurality of scattered points. In some embodiments, at least a portion of the longitudinal lines are marked on the outsole. In some embodiments, an angle between the anterior longitudinal lines and the posterior longitudinal lines ranges between 0-180 degrees. In some embodiments, at least one of the anterior parallel lines and the posterior parallel lines are a set of parallel lines. In some embodiments, the anterior and/or posterior longitudinal lines include one or more markings along the length of the longitudinal lines.

In some embodiments, the posterior portion of the outsole includes a posterior rail configured to couple to a protuberance. In some embodiments, the posterior rail includes a posterior rail midline and the posterior rail is positioned along the outsole such that the posterior rail midline is colinear with an axis of the posterior outsole map coordinate system. In some embodiments, the posterior outsole map coordinate system includes one or more of an anterior-medial quadrant, an anterior-lateral quadrant, a posterior-medial quadrant, and a posterior-lateral quadrant. In some embodiments, two or more of the quadrants are symmetrical in relation to each other.

In some embodiments, the alignment of the protuberance alignment lines with a coordinate point of the outsole map of the outsole is configured to shift the position of protuberance center in relation to the protuberance pivot. In some embodiments, shifting the protuberance in relation to the outsole rotates the perimeter of the protuberance such that the distance between the protuberance pivot and the outsole map coordinate point with which the protuberance is aligned is specific to the combination of protuberance alignment line and coordinate point of the outsole map aligned.

In some embodiments, shifting the protuberance in relation to the outsole rotates the perimeter of the protuberance such that the angle between the protuberance alignment line and the outsole map coordinate point with which the protuberance is aligned is specific to the combination of protuberance alignment line pointer and coordinate point of the outsole map aligned. In some embodiments, the proportions of distances between marks of the outsole map are proportionate to the size of a fitted shoe outsole of a user. In some embodiments, the size of the protuberance coordinate system is proportionate to the size of the outsole map. In some embodiments, the footwear includes a positioning code including an index of protuberance position options relating protuberance alignment in relation to the outsole with different training options for a user wearing the footwear.

In some embodiments, at least one of the outsole coordinate systems are configured such that positioning the protuberance at a specific position using the outsole coordinate system requires aligning two points of the protuberance coordinate system with at least one longitudinal line of the outsole coordinate system. In some embodiments, at least one of the outsole coordinate systems are configured such that positioning the protuberance at a specific position using the outsole coordinate system requires aligning one points of the protuberance coordinate system with one of the longitudinal lines of the outsole coordinate system and/or at least one marking along the longitudinal line.

There is provided, in accordance with some embodiments, a method for anterior, posterior shift, medial shift, and/or lateral shift of a protuberance, including starting with the protuberance in the neutral position, where the midline pointers are aligned with one of the posterior rail midline or the ML center line, sliding the protuberance along the posterior rail center line, and aligning the midline pointers with one of the longitudinal lines of the coordinate system of the posterior outsole map. In some embodiments, the method comprises including rotating the protuberance about the protuberance pivot.

There is provided, in accordance with some embodiments, a protuberance, including a convex surface in respect to an outsole of a footwear, and at least one protuberance coordinate system correspondable to at least one point on an outsole map on the outsole of the footwear, wherein the protuberance is configured to be movably mounted on the outsole and to contact the ground each of the reference points on the map represents a unique protuberance alignment setting in respect to the outsole map.

There is provided, in accordance with some embodiments, an outsole, including an anterior portion and a posterior portion configured to receive at least one movably mounted protuberance, and a visible outsole map representing a plurality of reference points based on at least one of an anterior portion coordinate system and a posterior portion coordinate system, wherein each of the reference points on the map represents a unique protuberance alignment setting in respect to the outsole map.

There is provided, in accordance with some embodiments, a footwear kit, including an outsole having an anterior portion and a posterior portion configured to receive at least one protuberance, the outsole including a visible outsole map representing a plurality of reference points based on at least one of an anterior portion coordinate system and a posterior portion coordinate system, and at least one protuberance movably mounted on the outsole and configured to contact the ground and including at least one visible protuberance coordinate system corresponding to the outsole map, a positioning code table including at least one position code including a set of monovalent calibration positions for positioning the protuberance in respect to the outsole, and wherein each of the reference points on the map represents a unique protuberance alignment setting in respect to the outsole map.

In some embodiments, the protuberance and the outsole are coupled via a lock and key system. In some embodiments, the positioning of the lock and key system is based on a plurality of code lines generated from the outsole map.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 17A and 17B collectively form a table of position codes in accordance with some embodiments of the invention;

FIG. 17C is a table of an exemplary protuberance position code set in accordance with some embodiments of the invention.

DETAILED DESCRIPTION OF THE INVENTION

Figure 1A:
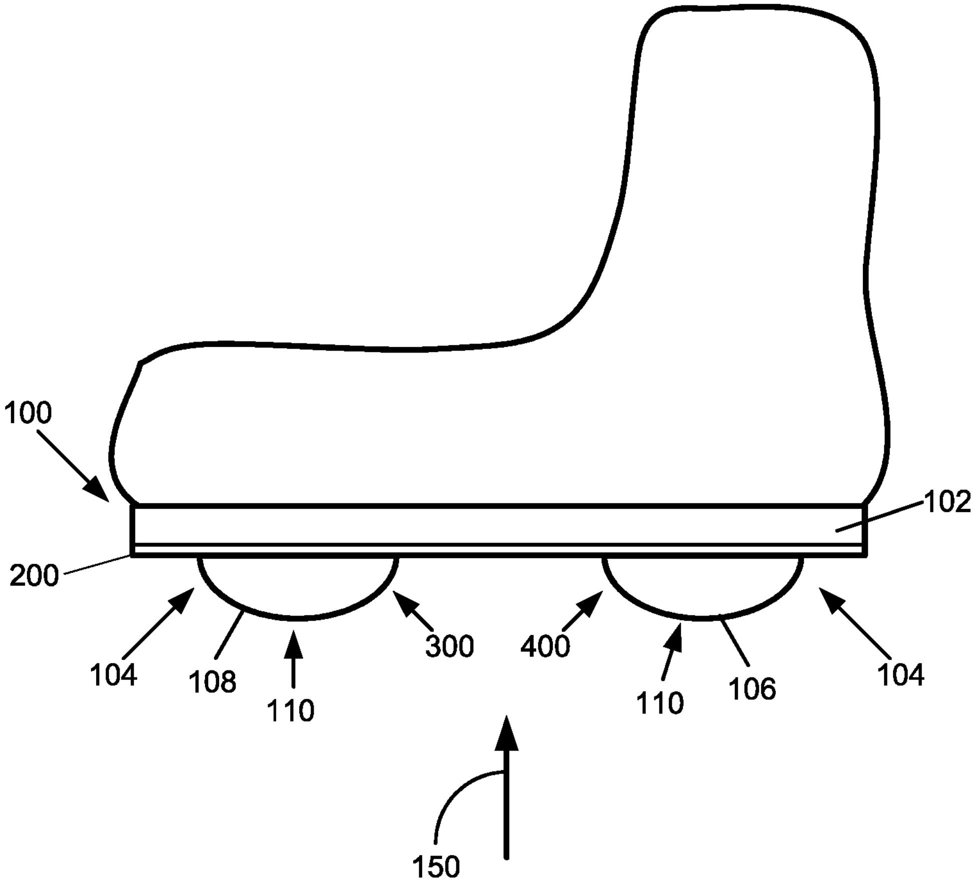
FIGS. 1A, 1B, and 1C are a side view simplified illustration of a corrective shoe and plan view simplified illustrations of protuberance adjustment system for footwear in accordance with some embodiments of the invention.

According to an aspect of some embodiments of the present invention there is provided footwear for training, developing and enhancing proprioceptive and kinesthetic skills and neuromuscular control. In some embodiments, the footwear includes one or more bulbous protrusions protruding from the underside of the footwear. In some embodiments, one of the protuberances is positioned more posteriorly than the other protuberance. These bulbous protrusions are also referred to as proprioceptive elements. In some embodiments, the underside or outsole of the footwear comprises a map. In some embodiments, the map is an outsole map.

In some embodiments, the outsole map comprises one or more coordinate systems of which at least one is an anterior coordinate system and at least one is a posterior coordinate system. In some embodiments, one or more coordinates of the coordinate system indicate a reference point for positioning a protuberance in respect to the outsole map. In some embodiments, a plurality of reference points is joined to form a line.

The terms "reference point" and "coordinate" are used interchangeably herein and refer to points on an outsole map with which a protuberance coordinate system is aligned.

In some embodiments, the footwear is configured to receive a foot of a human. In some embodiments, and as explained in greater detail herein, the protuberance is configured to align with an outsole map in accordance with a set of parameters specific to the user of the footwear. Once the protuberance is aligned with the outsole map and the footwear worn by the user placed on the ground, the position of the protuberance in respect to the outsole defines a spatial orientation of the foot of the user in respect to the surface of the ground.

In some embodiments, at least one coordinate system has parallel longitudinal alignment lines. In some embodiments, at least one coordinate system is arranged along a curve. In some embodiments, the outsole map comprises at least one coordinate system having a lateral side and a medial side with respect to the foot of a subject. In some embodiments, the coordinate system comprises a lateral side that is symmetrical to the medial side. In some embodiments, the coordinate system comprises a lateral side that is asymmetrical to the medial side. All references to the protuberance adjustment system, i.e., outsole map and/or protuberance coordinate system as used herein relate to the gait/posture corrective shoe as viewed in a direction indicated in FIG. 1A by an arrow 150.

According to an aspect of some embodiments of the present invention there is provided a protuberance coordinate system. In some embodiments, the protuberance comprises a protuberance pivot, which provides a rotation axis for the protuberance. In some embodiments, the protuberance coordinate system comprises alignment lines, which are brought into alignment with the outsole map during adjustment of the protuberance. In some embodiments, the protuberance coordinate system comprises an anterior portion configured to align the anterior outsole map with a protuberance. In some embodiments, the protuberance coordinate system comprises a posterior portion configured to align the posterior outsole map with a protuberance.

According to an aspect of some embodiments of the present invention there is provided an anterior coordinate system on the anterior outsole map, having at least one (Wa) axis. In some embodiments, the anterior coordinate system comprises a (Ma) axis. In some embodiments, the anterior coordinate system comprises a set of longitudinal lines with which the protuberance pointers are aligned during adjustment of the protuberance. In some embodiments, the set of anterior longitudinal lines have a central line, and in some embodiments, the central line is collinear with one of the axes of the anterior coordinate system. In some embodiments, the anterior coordinate system comprises anterior longitudinal lines on the medial side of the central line. In some embodiments, the anterior coordinate system comprises anterior longitudinal lines on the lateral side of the central line. In some embodiments, the outsole comprises an anterior rail. In some embodiments, the anterior rail midline is collinear with one of the axes of the anterior coordinate system. In some embodiments, the protuberance is adjusted in respect to the axes of the anterior coordinate system.

According to an aspect of some embodiments of the present invention there is provided a posterior coordinate system on the posterior outsole map. In some embodiments, the posterior coordinate system comprises longitudinal lines. In some embodiments, the longitudinal lines comprise hatch lines. In some embodiments, the hatch lines provide a scale by which the protuberance is adjusted onto the posterior portion of the outsole. In some embodiments, the outsole comprises a posterior rail. In some embodiments, the posterior rail midline is an axis of the posterior coordinate system. in some embodiments, the posterior protuberance is adjusted in respect to the axes of the posterior coordinate system.

According to an aspect of some embodiments of the present invention there is provided a method for lateral and medial shifting of the anterior protuberance. In some embodiments, the method comprises starting at the protuberance neutral position, aligning the protuberance center with the origin of the outsole anterior coordinate system. in some embodiments, the method comprises sliding the protuberance along the anterior rail center line. In some embodiments, the method comprises aligning a protuberance pointer with one of the longitudinal lines of the anterior coordinate system.

According to an aspect of some embodiments of the present invention there is provided a method for a posterior shift of the anterior protuberance. In some embodiments, the method comprises starting at the protuberance neutral position, aligning the protuberance center with the origin of the outsole anterior coordinate system such that the protuberance pivot is located on the lateral side with respect to the protuberance center. In some embodiments, the method comprises rotating the protuberance over the protuberance pivot in the posterior directions. In some embodiments, the method comprises aligning a protuberance pointer with one of the longitudinal lines of the anterior coordinate system.

According to an aspect of some embodiments of the present invention there is provided a method for an anterior shift of the anterior protuberance. In some embodiments, the method comprises starting at the protuberance neutral position, aligning the protuberance center with the origin of the outsole anterior coordinate system such that the protuberance pivot is located on the medial side with respect to the protuberance center. In some embodiments, the method comprises rotating the protuberance over the protuberance pivot in the anterior. In some embodiments, the method comprises aligning a protuberance pointer with one of the longitudinal lines of the anterior coordinate system.

According to an aspect of some embodiments of the present invention there is provided a method for a combined anterior or posterior shift and medial/lateral shift of the anterior protuberance. In some embodiments, the method comprises starting at the protuberance neutral position, aligning the protuberance center with the origin of the outsole anterior coordinate system. in some embodiments, the method comprises rotating the protuberance over the protuberance pivot in one of the posterior or the anterior directions. In some embodiments, the method comprises sliding the protuberance along the anterior rail center line. In some embodiments, the method comprises aligning a protuberance pointer with one of the longitudinal lines of the anterior coordinate system.

According to an aspect of some embodiments of the present invention there is provided a method for lateral and medial shifting of the posterior protuberance. In some embodiments, the method comprises starting with the posterior protuberance in the neutral position, where the midline pointers are aligned with one of the posterior rail midline and/or the ML center line. In some embodiments, the method comprises rotating the posterior protuberance about the protuberance pivot. In some embodiments, the method comprises aligning the midline pointers with one of the longitudinal lines of the posterior coordinate system of the posterior outsole map.

According to an aspect of some embodiments of the present invention there is provided a method for posterior and anterior shifting of the posterior protuberance. In some embodiments, the method comprises starting with the posterior protuberance in the neutral position, where the midline pointers are aligned with one of the posterior rail midline or the ML center line. In some embodiments, the method comprises sliding the protuberance along the posterior rail center line. In some embodiments, the method comprises aligning the midline pointers with at least one of the longitudinal lines of the posterior coordinate system of the posterior outsole map.

According to an aspect of some embodiments of the present invention there is provided a method for a combined anterior or posterior shift and medial/lateral shift of the posterior protuberance. In some embodiments, the method comprises starting with the posterior protuberance in the neutral position, where the midline pointers are aligned with one of the posterior rail midline or the ML center line. In some embodiments, the method comprises rotating the posterior protuberance about the protuberance pivot. In some embodiments, the method comprises sliding the protuberance along the posterior rail center line. In some embodiments, the method comprises aligning the midline pointers with one of the longitudinal lines of the posterior coordinate system.

In some embodiments, there is provided a gait/posture corrective shoe, which includes two bulbous protrusions protruding from the underside of footwear. One of the protuberances is positioned more posteriorly than the other protuberance. These bulbous protrusions are also referred to as protuberances. According to some embodiments of the present invention there is provided a gait/posture corrective shoe protuberance adjustment system. In some embodiments, the protuberance adjustment system for footwear for footwear comprises an outsole having an anterior outsole map and a posterior outsole map. In some embodiments, the protuberance adjustment system for footwear comprises an outsole map. In some embodiments, the protuberance adjustment system for footwear comprises an outsole-mountable protuberance having at least one protuberance coordinate system corresponding to the outsole map. In some embodiments, the alignment of the protuberance coordinate system with the outsole map places the protuberance in a predetermined position and/or orientation of the protuberance in respect to the outsole. In some embodiments, each discrete alignment of the protuberance coordinate system with the outsole map corresponds to a discrete position of the protuberance in relation to the outsole.

Reference is made to FIG. 1A, which shows a side view simplified illustration of a corrective shoe. In some embodiments, the corrective shoe comprises a protuberance adjustment system for footwear.

In some embodiments, the protuberance adjustment system 700 for footwear 100 comprises an outsole 102. In some embodiments, the protuberance adjustment system 700 for footwear comprises at least one protuberance 104. In some embodiments, one protuberance 104 is positioned more posteriorly than the other protuberance and is referred to as the posterior protuberance 106. In some embodiments, one protuberance 104 is positioned more anteriorly than the other protuberance and is referred to as the anterior protuberance 108. In some embodiments, the anterior protuberance 108 and the posterior protuberance 106 comprise the same markings. In some embodiments, the anterior protuberance 108 and the posterior protuberance 106 are interchangeable. In some embodiments, the protuberance 104 comprises a protuberance coordinate system 110. In some embodiments, the outsole comprises an outsole map 200. In some embodiments the protuberance 104 is a dome. In some embodiments, the outsole map 200 comprises one or more separate portions, for example, one or more of an anterior outsole map 300 and a posterior outsole map 400.

The Protuberance

Figure 1B:
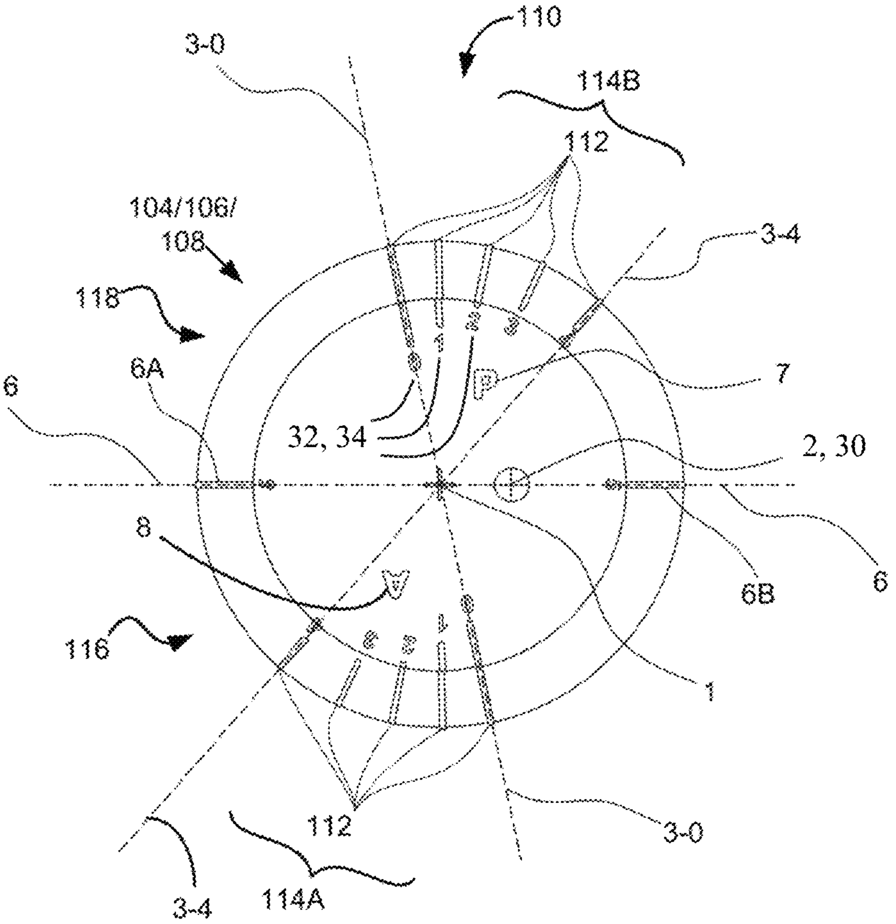
Figure 1C:
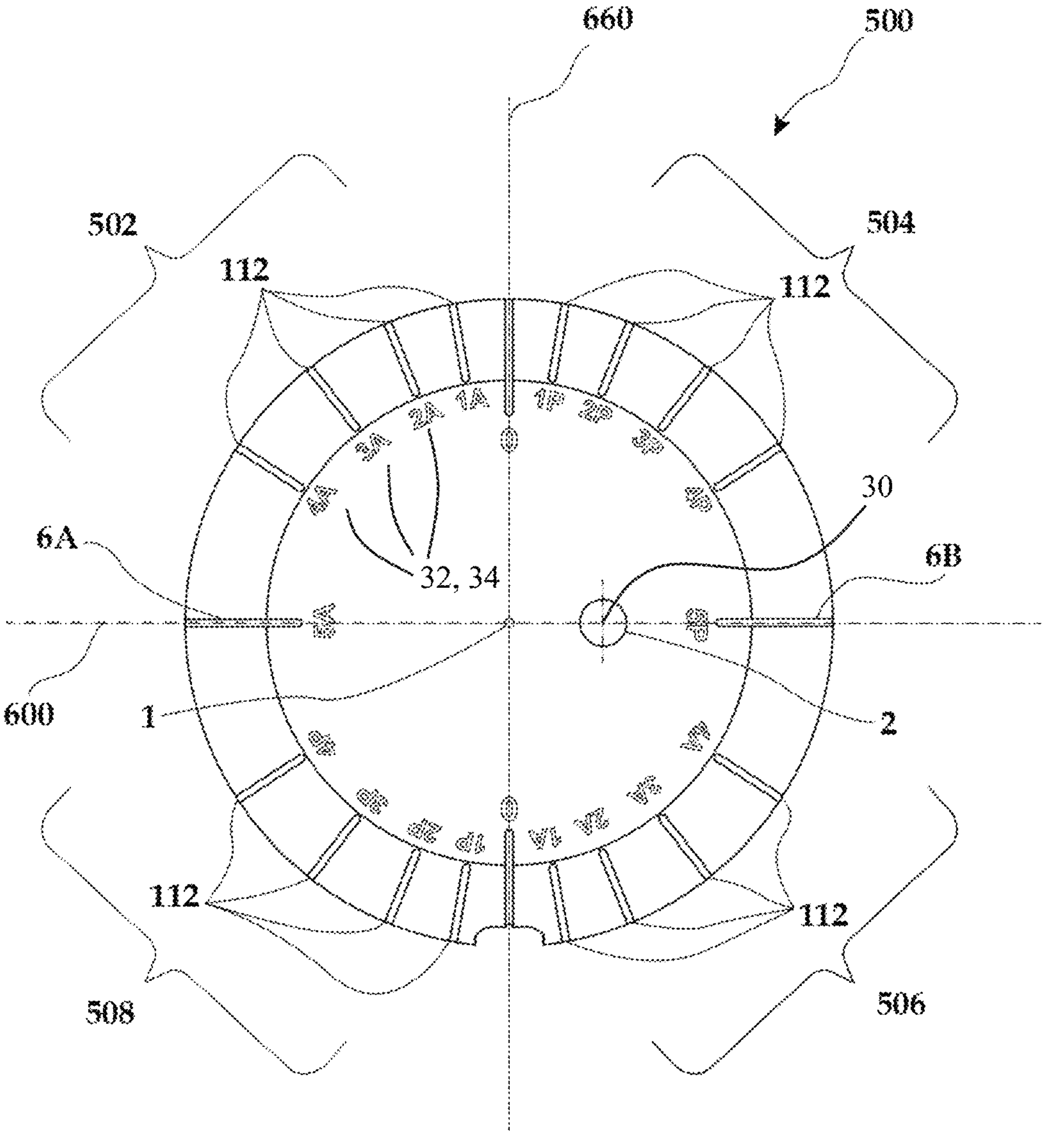

Reference is made to FIGS. 1B and 1C, which are plan view simplified illustrations of protuberance adjustment system for footwear in accordance with some embodiments of the invention. In some embodiments, the protuberances 104/500 depicted by FIGS. 1B and 1C are interchangeable within a protuberance adjustment system 700. In some embodiments, the protuberance 104/500 comprises a protuberance center 1. In some embodiments, the protuberance center 1 is marked on the protuberance. In some embodiments, the protuberance center 1 is the concentric vertex of the protuberance 104/500. In some embodiments, the protuberance center 1 comprises a concentric point of at least a portion of a circumference of the protuberance 104/500. In some embodiments, the protuberance 104/500 comprises a protuberance pivot 2. In some embodiments, the protuberance pivot 2 provides a rotation axis 30 for the protuberance 104/500. In some embodiments, the protuberance pivot 2 provides a rotation axis 30 perpendicular to one or more of a diameter of the protuberance 104/500 and the outsole 102.

In some embodiments, the pivot point 2 is configured such that the angle between the rotation axis and the outsole 102 is 0-180 degrees. In some embodiments, the protuberance pivot 2 is located 3-28 mm from the protuberance center 1. In some embodiments, the protuberance pivot 2 comprises a mechanical engagement element. In some embodiments, the mechanical engagement element is one or more of a screw, a pin, and a clamp. In some embodiments, the protuberance pivot 2 is a screw. In some embodiments, the protuberance pivot 2 is a screw engagement pivot. In some embodiments, the protuberance pivot 2 is a screw engagement pivot and is an integral part of the outsole 102.

In some embodiments, the protuberance 104/500 comprises one or more pointers 112. In some embodiments, the one or more pointers 112 are marked coordinates along the circumference of the protuberance 104/500. In some embodiments, pointers 112 are paired and arranged along a perimeter of protuberance 104/500. In some embodiments, one or more alignment lines 3 are colinear with each pair of pointers 112. In some embodiments, pointers are paired and diametrically opposed. In some embodiments, the protuberance 104 comprises 4-6 pair of pointers 112.

In some embodiments, the alignment line 3 crosses the protuberance 104 diameter. In some embodiments, the alignment line 3 crosses the protuberance 104 diameter through the protuberance center 1. In some embodiments, the difference of the distances between each of the collinear pointers 112 of at least one pair of collinear pointers 112 and the protuberance pivot 2 is 0-10 cm. In some embodiments, the difference of the distances between each of the collinear pointers 112 of at least one pair of collinear pointers 112 and the protuberance center 1 is 0-10 cm.

In some embodiments, each pair of pointers 112 is marked on the protuberance 104. In some embodiments, there are 4-8 pairs of pointers 112. In some embodiments, the pointers 112 are used to align the protuberance 104 with the outsole map 200. In some embodiments, only one pointer 112 is used to align the outsole map 200. In some embodiments, only one pointer 112 is used to align the protuberance 104/105 with the outsole map 200. In some embodiments, the alignment of one pointer 112 with the outsole map 200 misaligns the remaining pointers 112 with the outsole map 200. In some embodiments, the pointers 112 are numbered.

In some embodiments, the pointers 112 are divided to a plurality of sets 112. For example, in some embodiments, such as depicted by FIG. 1B, the protuberance 104 comprises two sets of pointers 114A and 114B, and the sets of pointers, 114A and 114B, are symmetrical across a diameter of the protuberance. In some embodiments, such as depicted by FIG. 1C, and as described in greater detail elsewhere herein, the protuberance 500 comprises four sets of pointers. In some embodiments, such as the exemplary embodiment depicted in FIG. 1B, each alignment line 3 is collinear with two pointers 112 marked by the same mark. for example, alignment line 3-0 of FIG. 1B shows an alignment line 3 having two pointers 112 each labeled No. 0. In another example, alignment line 3-4 shows an alignment line 3 having two pointers 112 each labeled No. 4. In some embodiments, as in the embodiment depicted by FIG. 1B, each one of the two pointers 112 of an alignment line 3 is in a different set of pointers 114A and 114B. In some embodiments, the alignment lines 3 are numbered at either or both pointers 112 of the alignment line 3.

In some embodiments, the protuberance 104/500 comprises midline pointer 6. In some embodiments, the protuberance 104 comprises at least one midline pointer 6, for example, a first midline pointer 6A and a second midline pointer 6B. In some embodiments, the distance between the first midline pointer 6A and the protuberance pivot 2 is larger than the distance between the second midline pointer 6B and the protuberance pivot 2. In some embodiments, the first and second midline pointers 6A and 6B are collinear. In some embodiments, the virtual collinear line of the midline pointers 6 crosses the protuberance 104/500 diameter. In some embodiments, the virtual collinear line of the midline pointer 6 crosses the protuberance 104/500 diameter through the protuberance center 1. In some embodiments, the midline pointer 6 splits the protuberance 104/500 symmetrically.

In some embodiments, the pointers 112 are numbered starting with No. 0. In some embodiments, the midline pointer 6 is numbered. In some embodiments, such as depicted by FIG. 1B, the midline pointers 6 comprise pointers 112 that are marked with the No. 5. In some embodiments, such as depicted by FIG. 1C, the midline pointers 6 comprise pointers 112 which are marked with the No. 5A and 5P.

In some embodiments, such as depicted by FIG. 1B, the protuberance comprises an anterior section 116 and a posterior section 118. In some embodiments, each portion comprises a set of alignment lines 3. In some embodiments, the anterior section 116 is marked. In some embodiments, the anterior section 116 is marked with the letter A 8. In some embodiments, the posterior section 118 is marked. In some embodiments, the posterior section 118 is marked with the letter P 7. In some embodiments, the collinear line of the midline pointer 6 comprises pointers 112 that separates between the anterior section 116 and the posterior section 118.

A potential advantage of the protuberance coordinate system 110 is in that it enables alignment of the protuberance 104/500 with the outsole 102. This alignment allows a user to control the position of the protuberance 104/500 in relation to the outsole 102.

A potential advantage of the protuberance coordinate system 110 comprising a posterior section 118 and an anterior section 116 is that the protuberance coordinate system is used to control the positioning of a protuberance 104 that is placed on an outsole 102, and therefore the protuberance 104 is independent of the outsole 102.

Reference is made to FIG. 1C, which is a plan view simplified illustrations of protuberance adjustment system for footwear in accordance with some embodiments of the invention. In some embodiments, the protuberance 500 comprises a plurality sets of pointers, such as, for example, the four sets 502, 504, 506, and 508, as depicted in FIG. 1C. In some embodiments, each of the sets of pointers 502/504/506/508. In some embodiments, the protuberance 500 comprises a midline 600 which is colinear with the first midline pointer 6A, the second midline pointer 6B, and the protuberance center 1. In some embodiments, each set of pointers 502/504/506/508 comprises a plurality of pointers 112.

In some embodiments, the midline 600 divides the protuberance 500 into two halves. In some embodiments, one or more additional lines 660 traverse the midline 600 such that each of the halves are split into two or more sections. In some embodiments, each of the sections comprise a set of pointers, such as the sets 502/504/506/508. In some embodiments, the one or more additional lines 660 are colinear with one or more pairs of pointers 112, for example, in the embodiment depicted by FIG. 1C, the additional line 660 is colinear with the pair of pointers 112 marked by the No. 0. in some embodiments, the sets of pointers 502/504/506/508 comprise one or more pointers which are configured to align with the outsole map 200.

In some embodiments, two or more of the sets 502/504/506/508 are symmetrical in relation to one or more of the midline 600 and the additional line 660. In some embodiments, one or more of the sets 502/504/506/508 are configured for alignment of the protuberance 500 with different portions of the anterior outsole map 300. For example, in some embodiments, one or more of the sets 502/504/506/508 are configured for alignment of the protuberance 500 with a portion of the outsole map 300 anterior in relation to an anterior rail midline. For example, in some embodiments, one or more of the sets 502/504/506/508 are configured for alignment of the protuberance 500 with a portion of the outsole map 300 posterior in relation to the anterior rail midline.

In some embodiments, the one or more sets 502/504/506/508 which are configured to align with the portion of the anterior outsole map. in some embodiments, alignment of the protuberance 500 places the protuberance center 1 either posterior or anterior to an anterior rail midline of the outsole 102. In some embodiments, one or more sets 502/504/506/508 are marked P and are configured to align with the outsole map 200 such that the protuberance center 1 is positioned in a portion of the outsole map 200 which is posterior in relation to the anterior rail midline. In some embodiments, one or more sets 502/504/506/508 are marked A and are configured to align with the outsole map 200 such that the protuberance center 1 is positioned in a portion of the outsole map 200 which is anterior in relation to the anterior rail midline.

In some embodiments, the sets of pointers 502/504/506/508 are positioned along the protuberance such that the pointers 112 of the protuberance 500 are symmetrically positioned. In some embodiments, a plurality of the pointers 112 comprise a plurality of symmetry lines.

A potential advantage of the protuberance 500 comprising a plurality of pointers 112 which are positioned symmetrically in relation to a plurality of symmetry lines is in that the protuberance 500 is alignable with one or more of the medial and lateral sides of the outsole 102 regardless of the position of the center 1 and/or the pivot 2 in relation to the anterior rail midline.

Anterior Outsole

Figure 2:
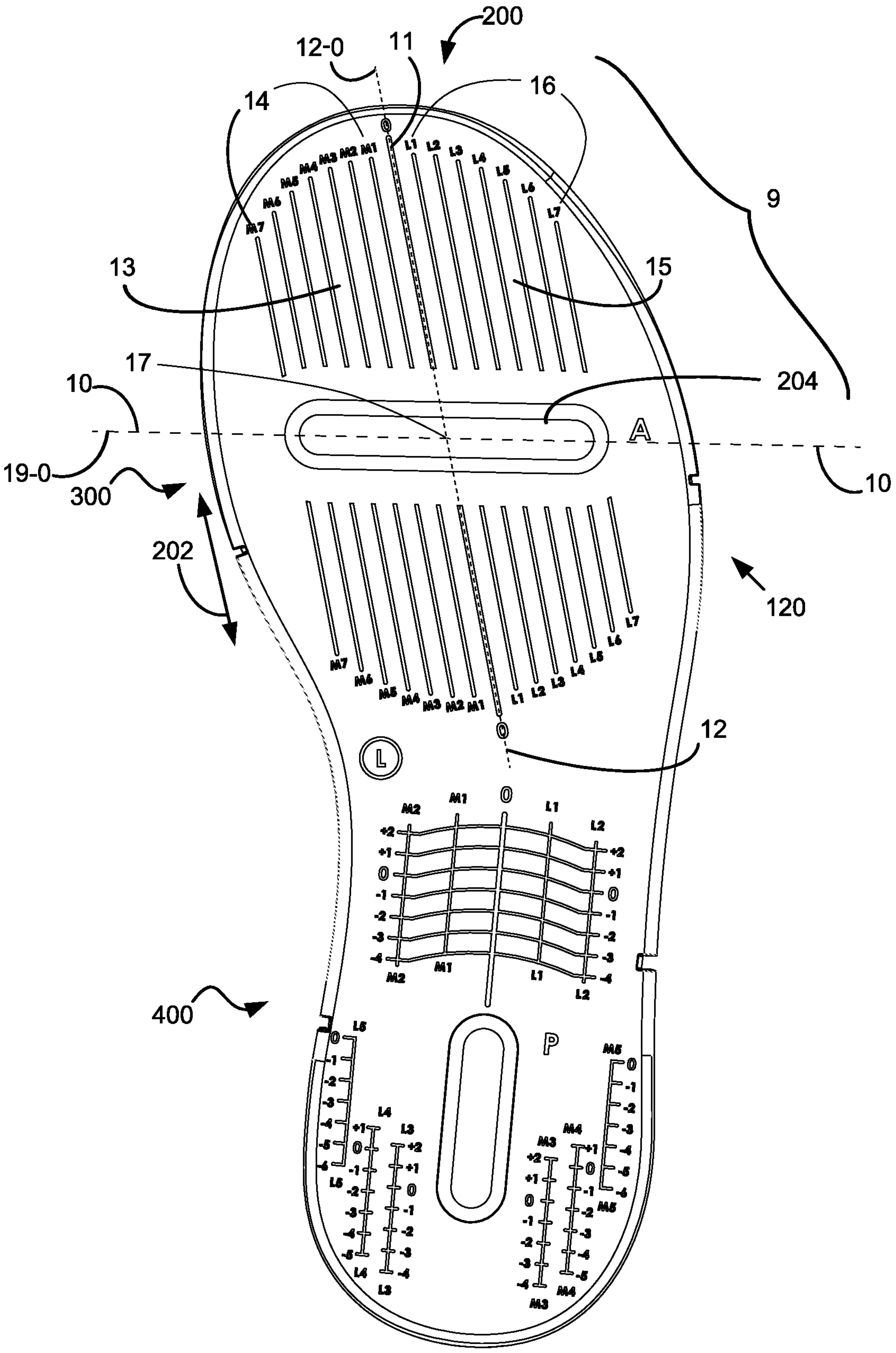
FIG. 2 is a plan view simplified illustration of an outsole map in accordance with some embodiments of the invention.

Reference is made to FIG. 2, which is a simplified illustration of an outsole map in accordance with some embodiments of the invention. In some embodiments, the outsole map 200 comprises at least one or more of an anterior outsole map 300 and a posterior outsole map 400. In some embodiments, the outsole map 200 comprises a plurality of coordinate systems. In some embodiments, the anterior outsole map 300 is different than the posterior outsole map 400.

In some embodiments, the outsole map 200 comprises an anterior coordinate system 120. In some embodiments, the coordinate system 120 comprises at least one of a (Ma) axis 12-0 and a (Wa) axis 19-0.

In some embodiments, the anterior coordinate system 120 comprises anterior longitudinal lines 9. In some embodiments, the anterior longitudinal lines 9 are parallel. In some embodiments, the anterior longitudinal lines 9 are marked in the anterior-posterior direction 202. In some embodiments, one of the anterior longitudinal lines 9 is an anterior central line 11. In some embodiments, the anterior central line 11 is marked 0. In some embodiments, the anterior central line 11 is in the center of the anterior longitudinal line 9. In some embodiments, the anterior longitudinal lines 9 comprise one or more of medial-anterior longitudinal lines 14 and lateral-anterior longitudinal lines 16.

In some embodiments, the anterior central line 11 splits the anterior outsole map 300 to the outsole medial segment 13 and the outsole lateral segment 15. In some embodiments, the outsole medial segment 13 comprises a portion of the longitudinal lines 9, for example, the medial-anterior longitudinal lines 14. In some embodiments, the outsole lateral segment 15 comprises a portion of the longitudinal lines 9, for example, the lateral-anterior longitudinal lines 16.

In some embodiments, the outsole medial segment 13 is the portion of the outsole from the anterior central line 11 to the medial side of the outsole. In some embodiments, the outsole medial segment comprises anterior medial longitudinal lines 14. In some embodiments, the medial-anterior longitudinal lines 14 are the anterior longitudinal lines 9 on the outsole medial segment 13. In some embodiments, the medial-anterior medial longitudinal lines 14 are marked in ascending and/or descending order. In some embodiments, the medial-anterior longitudinal lines 14 are marked by a letter proceeded with a number, e.g., M1, M2, M3.

In some embodiments, the outsole lateral segment 15 is the portion of the outsole from the anterior central line 11 to the lateral side of the outsole. In some embodiments, the outsole medial segment comprises anterior-lateral longitudinal lines 16. In some embodiments, the lateral-anterior longitudinal lines 16 are the anterior longitudinal lines 9 on the outsole medial segment 13. In some embodiments, the lateral-anterior longitudinal lines 16 are marked in ascending order. In some embodiments, the lateral-anterior longitudinal lines 16 are marked by a letter proceeded with a number, e.g., L1, L2, L3.

In some embodiments, the distance between two consecutive anterior longitudinal lines 9 is 0.05-15 mm. In some embodiments, the distance between two consecutive anterior longitudinal lines 9 is 5-10 mm. In some embodiments, the distance between two consecutive the anterior longitudinal lines 9 varies. In some embodiments, the distances between two consecutive anterior longitudinal lines 9 is different for different sized outsoles. In some embodiments, the distance between two consecutive anterior longitudinal lines 9 is proportional to the outsole length. In some embodiments, the distance between two consecutive anterior longitudinal lines 9 is proportional to the outsole width.

In some embodiments, the anterior outsole map 300 comprises at least one anterior rail 204, configured to accommodate a protuberance 104. In some embodiments, the anterior outsole map 300 comprises an anterior rail 204, configured to accommodate a coupling e.g., a screw, pin, gear. In some embodiments, the coupling couples the protuberance 104 and the outsole 102. In some embodiments, the anterior outsole map 300 is positioned in relation to the anterior rail 204.

In some embodiments, the anterior rail 204 comprises an anterior rail midline 10, which comprises a virtual line along the longitudinal axis of the anterior rail 204. In some embodiments, the anterior rail midline 10 splits the anterior rail 204 into two segments. In some embodiments, the anterior rail midline 10 splits the anterior rail 204 to two segments in the anterior-posterior direction 202.

In some embodiments, the anterior rail midline 10 and the anterior central line 11 of the anterior longitudinal lines 9 form an angle of 0 to 180 degrees. For example, in some embodiments, such as depicted in FIGS. 5C and 5D, the angle between the anterior rail midline 10 and the anterior central line 11 is 90. In some embodiments, the anterior rail midline 10 and the anterior central line 11 of the anterior longitudinal lines 9 form an angle of 45-125 degrees. In some embodiments, the angle between the anterior rail midline 10 and the anterior central line 11 of the anterior longitudinal lines 9 is 60-90 degrees. In some embodiments, the angle between the anterior rail midline 10 and the anterior central line 11 of the anterior longitudinal lines 9 is different for different sized outsoles. In some embodiments, the angle between the anterior rail midline 10 and the anterior central line 11 of the anterior longitudinal lines 9 is proportional to the length of the outsole. In some embodiments, the angle between the anterior rail midline 10 and the anterior central line 11 of the anterior longitudinal lines 9 is proportional to the width of the outsole.

In some embodiments, the coordinate system 120 comprises a (Wa) axis 19-0. In some embodiments, the coordinate system 120 comprises a (Ma) axis 12-0. In some embodiments, one of the axes of the anterior coordinate system 120 is collinear with the anterior rail midline 10. In some embodiments, one of the axes of the anterior coordinate system 120 is collinear with the anterior central line 11 of the anterior longitudinal lines 9. In some embodiments, the axes of the anterior coordinate system 120 are perpendicular. In some embodiments, the axes of the anterior coordinate system 120 form an angle of 10-90 degrees. In some embodiments, the cross section of the anterior rail midline 10 and the anterior central line 11 of the anterior longitudinal lines 9 is the midpoint of the rail midline 10. In some embodiments, the cross section of the anterior rail midline 10 and the anterior central line 11 of the anterior longitudinal lines 9 comprises an anterior origin 17 of the anterior coordinate system 120.

Figure 3:
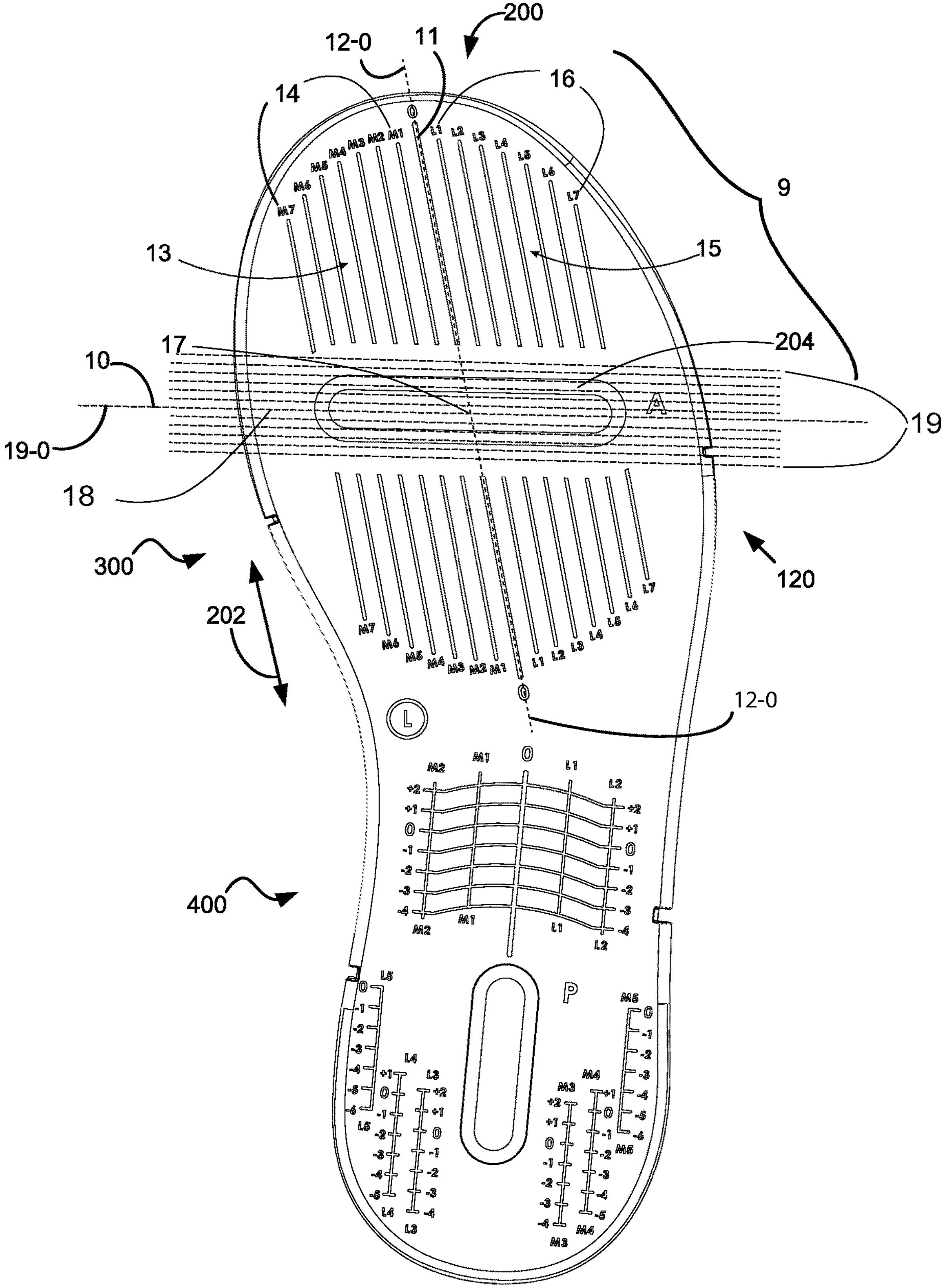
FIG. 3 is a plan view simplified illustration of a virtual matrix of the anterior outsole map in accordance with some embodiments of the invention.

Reference is made to FIG. 3, which is a plan view simplified illustration of a virtual matrix of the anterior outsole map in accordance with some embodiments of the invention. In some embodiments, the anterior outsole map 300 comprises at least one virtual matrix 18. In some embodiments, the virtual matrix 18 comprises matrix latitudinal lines 19. In some embodiments, the matrix latitudinal lines 19 are parallel to the anterior rail midline 10. In some embodiments, the angle between the matrix latitudinal lines 19 and the anterior rail midline 10 is 0.01-180 degrees. In some embodiments, the angle between the matrix latitudinal lines 19 and the anterior rail midline 10 is 10-100 degrees. In some embodiments, the angle between the matrix latitudinal lines 19 and the anterior rail midline 10 is 20-45 degrees.

In some embodiments, the matrix latitudinal lines 19 are curved. In some embodiments, the matrix latitudinal lines 19 are equally spaced from each other. In some embodiments, one axis of the virtual matrix 18 is the anterior rail midline 10. In some embodiments, the matrix latitudinal lines 19 are on both anterior and posterior sides of the rail. In some embodiments, the virtual matrix 18 comprises one or more matrix longitudinal lines 9. In some embodiments, the matrix longitudinal lines 9 comprise and/or are parallel to one or more of the lateral-anterior longitudinal lines 16 and the medial-anterior longitudinal lines 14.

Posterior Outsole

Figure 4:
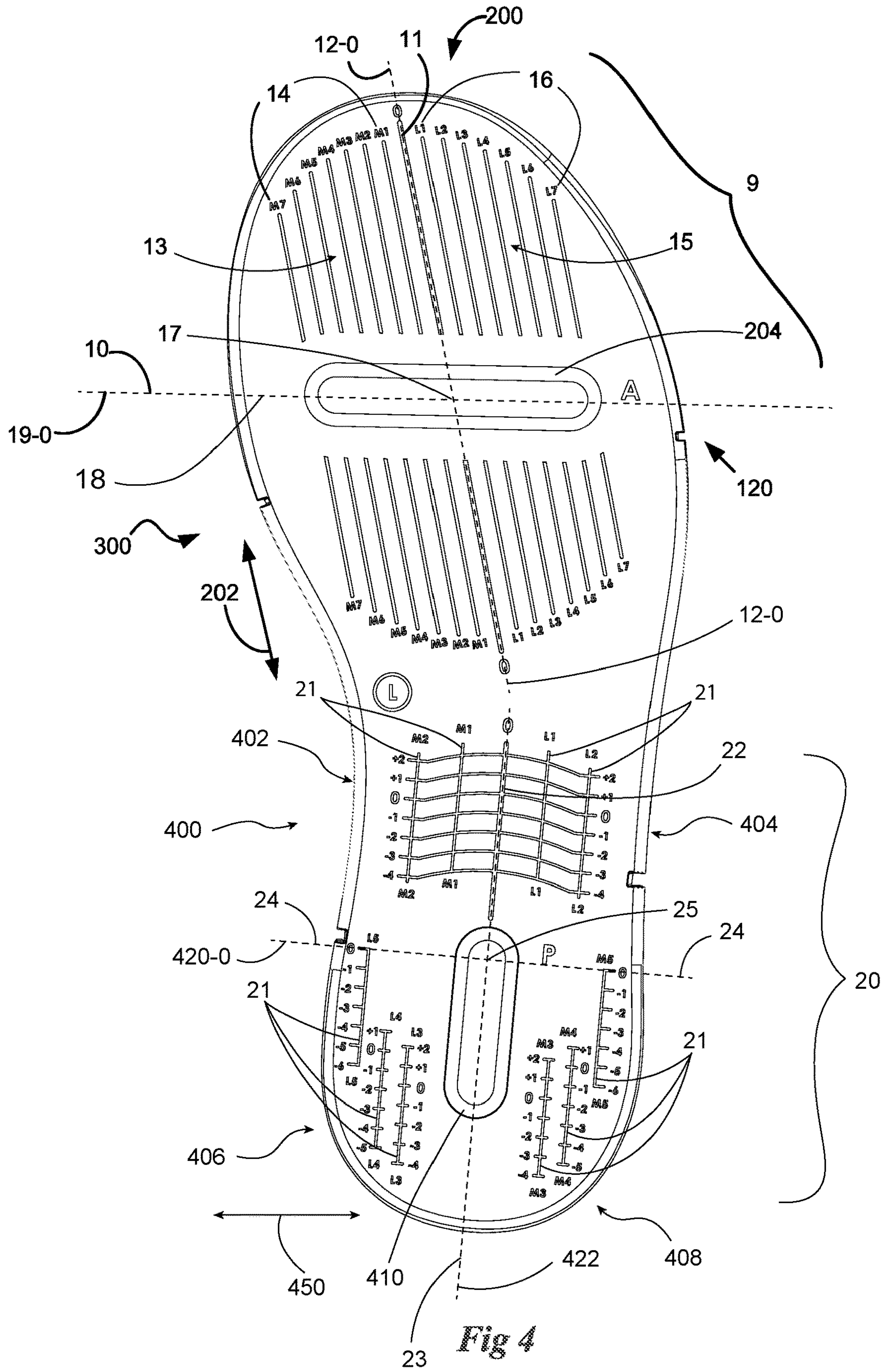
FIG. 4 is a plan view simplified illustration of the outsole map in accordance with some embodiments of the invention.

Reference is made to FIG. 4, which is a plan view simplified illustration of an outsole map in accordance with some embodiments of the invention, and to FIGS. 5A, 5B, 5C and 5D, which are plan view simplified illustrations of an outsole map in accordance with some embodiments of the invention. In some embodiments, the posterior outsole map 400 comprises posterior longitudinal lines 21. In some embodiments, the posterior longitudinal line 21 are anterior to the posterior rail 410. In some embodiments, the posterior longitudinal lines 21 are posterior to the posterior rail 410. In some embodiments, the posterior longitudinal lines 21 are placed medially in relation to the posterior rail 410. In some embodiments, the posterior longitudinal lines 21 are placed laterally in relation to the posterior rail 410. In some embodiments, the posterior longitudinal lines 21 are parallel.

In some embodiments, the posterior longitudinal lines 21 are equally spaced apart. In some embodiments, the distance between the posterior longitudinal lines 21 varies. In some embodiments, different posterior longitudinal lines 21 are marked on different areas of the posterior portion of the outsole. In some embodiments, the distance between the posterior longitudinal lines 21 is between 0.05-15 mm. In some embodiments, the distance between the posterior longitudinal lines 21 is between 3-10 mm. In some embodiments, the distance between the posterior longitudinal lines 21 is different in different sized outsoles. In some embodiments, the distance between the posterior longitudinal lines 21 is proportional to the length of the outsole. In some embodiments, the distance between the posterior longitudinal lines 21 is proportional to the width of the outsole.

In some embodiments, the posterior longitudinal lines 21 are in the anterior-posterior direction 202. In some embodiments, the angle between the posterior longitudinal lines 21 of the outsole and the anterior longitudinal lines 9 is between 0-180 degrees. In some embodiments, the angle between the posterior longitudinal lines 21 and the anterior longitudinal lines 9 is between 45-125 degrees. In some embodiments, the angle between the posterior longitudinal lines 21 the anterior longitudinal lines 9 is between 60-100 degrees. In some embodiments, the angle between the posterior longitudinal lines 21 and the anterior longitudinal lines 9 is different in different sized outsoles 102. In some embodiments, the angle between the posterior longitudinal lines 21 and the anterior longitudinal lines 9 is proportional to the length of the outsole 102. In some embodiments, the angle between the posterior longitudinal lines 21 and the anterior longitudinal lines 9 is proportional to the width of the outsole 102.

In some embodiments, the posterior longitudinal lines 21 comprise a ML center line 22. In some embodiments, the ML center line 22 is parallel to the posterior longitudinal lines 21. In some embodiments, the ML center line 22 is marked on the outsole 102. In some embodiments, the ML center line 22 is the middle line of the posterior longitudinal lines 21.

In some embodiments, the posterior outsole map 400 comprises at least one posterior rail 410, configured to accommodate a protuberance. In some embodiments, the posterior outsole map 400 comprises a posterior rail 410, configured to accommodate a coupling e.g., a screw, pin, gear. In some embodiments, the coupling couples the protuberance 104 and the outsole 102. In some embodiments, the posterior rail 410 comprises a posterior rail midline 23. In some embodiments, the posterior rail midline 23 is a virtual line. In some embodiments, the posterior rail midline 23 splits the posterior rail 410 into two segments. In some embodiments, the posterior rail midline 23 splits the posterior rail 410 into two symmetric segments. In some embodiments, the posterior rail midline 23 splits the posterior rail 410 into two segments in the medial-lateral direction 450. In some embodiments, the posterior rail midline 23 and the ML center line 22 are collinear. In some embodiments, the posterior rail midline 23 and the ML center line 22 are parallel. In some embodiments, the angle between the posterior rail midline 23 and the ML center line 22 is between 0-180 degrees. In some embodiments, the angle between the posterior midline 23 and the ML center line 22 is different in different sized outsoles 102. In some embodiments, the angle between the posterior rail midline 23 and the ML center line 22 is proportional to the length of the outsole 102. In some embodiments, the angle between posterior rail midline 23 and the ML center line 22 is proportional to the width of the outsole 102.

In some embodiments, the posterior outsole map 400 comprises an AP center line 24. In some embodiments, the AP center line 24 is a virtual line. In some embodiments, the AP center line 24 is perpendicular to the posterior rail midline 23. In some embodiments, the angle between the AP center line 24 and the posterior rail midline 23 is between 0-180 degrees. In some embodiments, the angle between the AP center line 24 and the posterior rail midline 23 is different in different sized outsoles 102. In some embodiments, the angle between the AP center line 24 and the posterior rail midline 23 is proportional to the length of the outsole 102. In some embodiments, the angle between the AP center line 24 and the posterior rail midline 23 is proportional to the width of the outsole 102.

In some embodiments, the posterior outsole map 400 comprises at least one posterior coordinate system 20. In some embodiments, the posterior coordinate system 20 comprises at least one (Mp) axis 422. In some embodiments, the posterior coordinate system comprises a (Wp) axis 420-0. In some embodiments, at least one of the axes of the posterior coordinate system 20 is collinear with the ML center line 22. In some embodiments, at least one of the axes of the posterior coordinate system 20 is collinear with the posterior rail midline 23. In some embodiments, at least one of the axes of the posterior coordinate system 20 is collinear with the AP center line 24. In some embodiments, at least one of the axes of the posterior coordinate system 20 is perpendicular to the AP center line 24. In some embodiments, the axes of the posterior coordinate system 20 are perpendicular. In some embodiments, the posterior origin 25 is the cross section of the (Mp) axis 422 and (Wp) axis 420-0 of the posterior coordinate system 20. In some embodiments, the posterior coordinate system 20 divides the posterior outsole map to at least four quadrants: medial-anterior quadrant 402, medial-posterior quadrant 406, lateral-anterior quadrant 404, and lateral-posterior quadrant 408.

In some embodiments, the medial-anterior quadrant 402 is symmetrical to the medial-posterior quadrant 406 in relation to the (Wp) axis 420-0. In some embodiments, the medial-anterior quadrant 402 is asymmetrical to the medial-posterior quadrant 406 in relation to the (Wp) axis 420-0. In some embodiments, the lateral-anterior quadrant 404 is symmetrical to the lateral-posterior quadrant 408 in relation to the (Wp) axis 420-0. In some embodiments, the lateral-anterior quadrant 404 is asymmetrical to the lateral-posterior quadrant 408 in relation to the (Wp) axis 420-0. In some embodiments, the medial-anterior quadrant 402 is symmetrical to the lateral-anterior quadrant 404 in relation to the (Mp) axis 422.

In some embodiments, the medial-anterior quadrant 402 is asymmetrical to the lateral-anterior quadrant 404 in relation to the (Mp) axis 422. In some embodiments, the medial-posterior quadrant 406 is symmetrical to the lateral-posterior quadrant 408 in relation to the (Mp) axis 422. In some embodiments, the medial-posterior quadrant 406 is asymmetrical to the lateral-posterior quadrant 408 in relation to the (Mp) axis 422. In some embodiments, at least one of the lateral-anterior quadrant 404, the medial-anterior quadrant 402, the lateral-posterior quadrant 408, and/or the medial-posterior quadrant 406, comprise no markings.

Reference is made to FIGS. 5A, 5B, 5C and 5D, which are plan view simplified illustrations of an outsole map in accordance with some embodiments of the invention. In some embodiments, the posterior longitudinal lines 21 comprise medially shifting lines 26 and laterally shifting lines 27. In some embodiments, the medially shifting lines 26 are marked on the outsole 102 in ascending order. In some embodiments, the medially shifting lines 26 are marked on the outsole 102 by the letter M proceeded with a number, e.g., M1, M2, M3. In some embodiments, the medially shifting lines 26 comprise of 1-15 lines. In some embodiments, at least one of the medially shifting lines 26 is marked on the medial-anterior quadrant 402. In some embodiments, at least one of the medially shifting lines 26 is marked on the lateral-posterior quadrant 408.

In some embodiments, the laterally shifting lines 27 are marked on the outsole 102 in ascending order. In some embodiments, the laterally shifting lines 27 are marked on the outsole 102 by the letter L proceeded with a number, e.g., L1, L2, L3. In some embodiments, the laterally shifting lines 27 comprise of 1-15 lines. In some embodiments, at least one of the laterally shifting lines 27 is marked on the lateral-anterior quadrant 404. In some embodiments, at least one of the laterally shifting lines 27 is marked on the medial-posterior quadrant 406.

In some embodiments, the medial-posterior quadrant 406 comprises medially shifting lines 26 that are mirroring the laterally shifting lines of the lateral-posterior quadrant 408. In some embodiments, the medial-anterior quadrant 402 comprises medially shifting lines 26 that are mirroring the laterally shifting lines 27 of the lateral-anterior quadrant 404. In some embodiments, the laterally shifting lines 27 form a mirror view of the medially shifting lines 26.

In some embodiments, the posterior longitudinal lines 21 comprise hatch marks 28. In some embodiments, the hatch marks 28 are equally distanced. In some embodiments, the hatch marks 28 are comprised of 1-20 marks. In some embodiments, the hatch marks 28 comprise of 3-7 marks. In some embodiments, the hatch marks are perpendicular to the posterior longitudinal lines 21. In some embodiments, the angle between a hatch mark 28 and the posterior longitudinal lines 21 is between 0-180 degrees. In some embodiments, the angle between each hatch mark 28 on a single line of the posterior longitudinal lines 21 is different. In some embodiments, the hatch marks 28 are arched. In some embodiments, the hatch marks 28 are arranged along a curve. In some embodiments, the hatch marks 28 are arranged along a curve having a radius equal to the radius of the posterior protuberance 106. In some embodiments, the hatch marks 28 are arranged symmetrically in relation to at least one of the posterior longitudinal lines 21. In some embodiments, the hatch marks 28 are arranged along a curve having a radius larger than the radius of the posterior protuberance 106. In some embodiments, the hatch marks 28 are marked with reference numbers. In some embodiments, the hatch marks 28 reference numbers correspond to the position of a protuberance 104. In some embodiments, the distance between the hatch marks 28 is proportional to the size of the outsole 102. In some embodiments, the distance between the hatch marks 28 is proportional to the length of the outsole 102. In some embodiments, the distance between the hatch marks 28 is proportional to the width of the outsole 102.

In some embodiments, the hatch marks 28 comprise a scale 412. In some embodiments, the scale 412 ranges from −10 to +7. In some embodiments, the scale 412 ranges from −6 to +2. In some embodiments, the scale 412 ranges from −5 to +1. In some embodiments, each of the longitudinal lines 21 comprises a different scale 412. In some embodiments, the scale 412 is marked on the outsole 102.

In some embodiments, the scale 412 correlates to the position of the protuberance center 1 in relation to the outsole 102. In some embodiments, the scale 412 correlates to the position of the protuberance pivot 2 in relation to the outsole 102. In some embodiments, the protuberance 104 is aligned with a hatch mark 28 labeled No. 0 in its neutral position, as described in greater detail elsewhere herein.

Figure 5A:
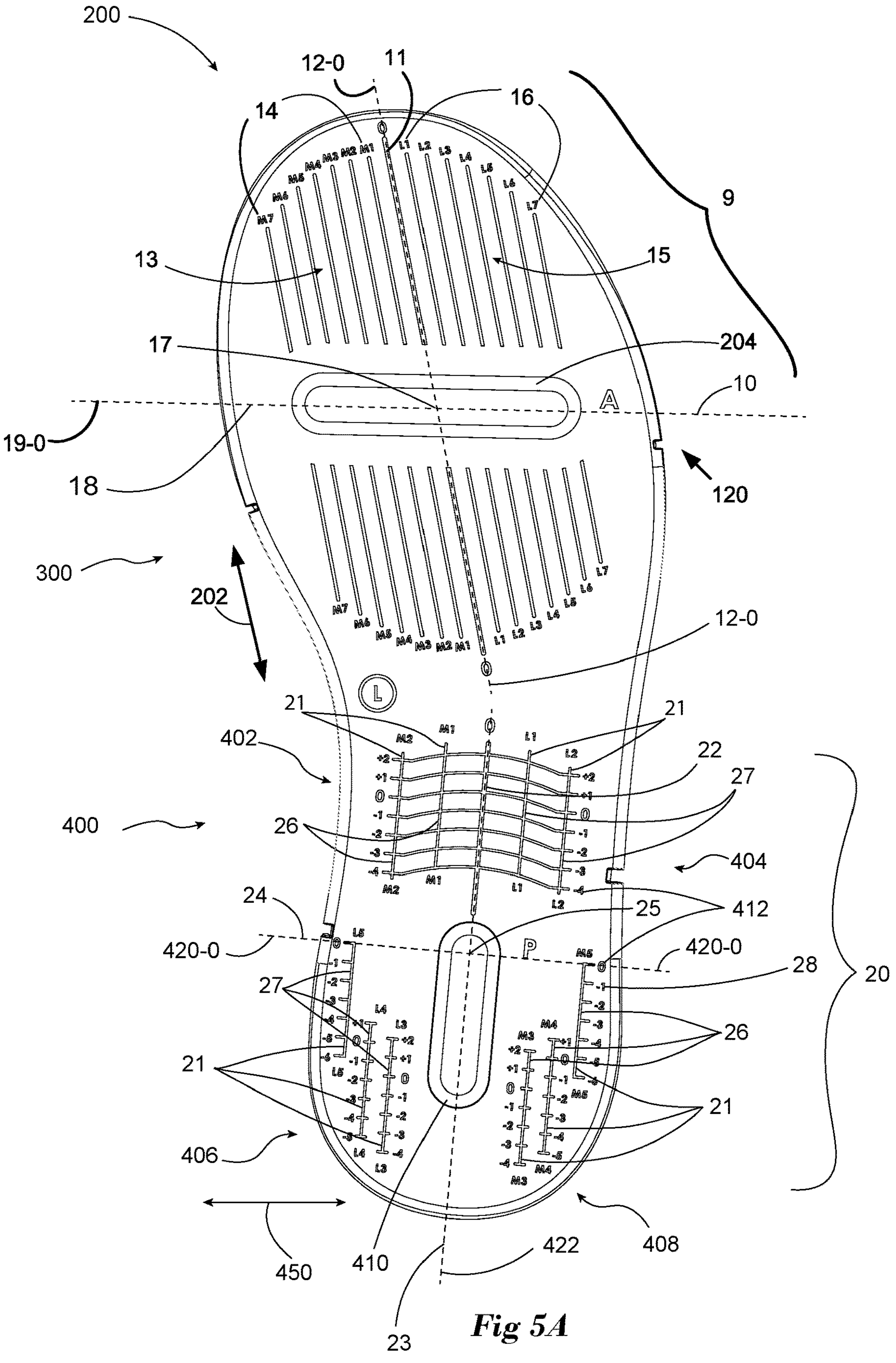
FIGS. 5A, 5B, 5C and 5D are plan view simplified illustrations of an outsole map in accordance with some embodiments of the invention.
Figure 5B:
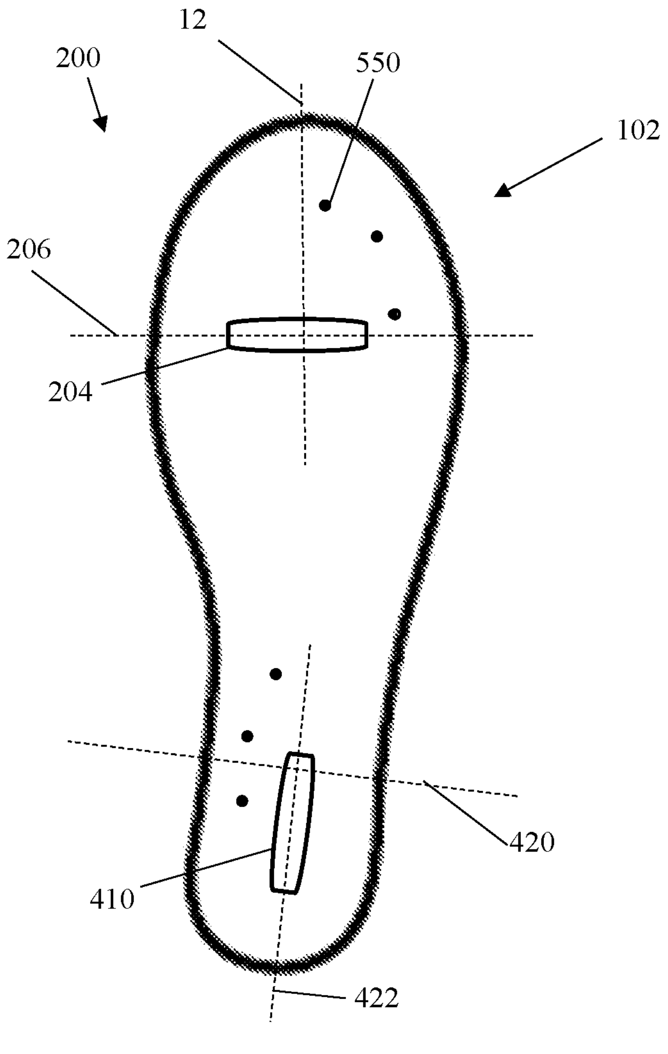
Figure 5C:
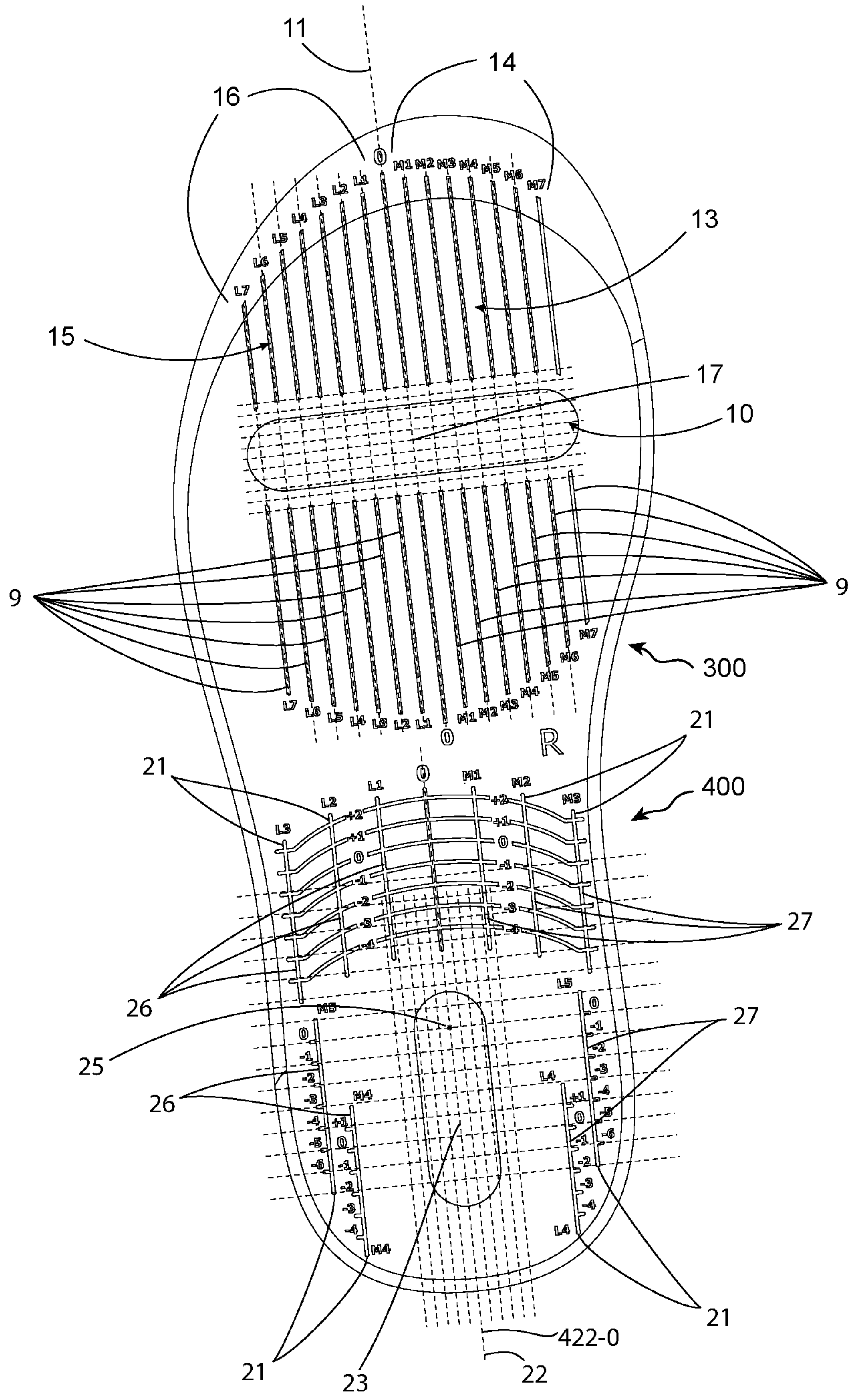
Figure 5D:
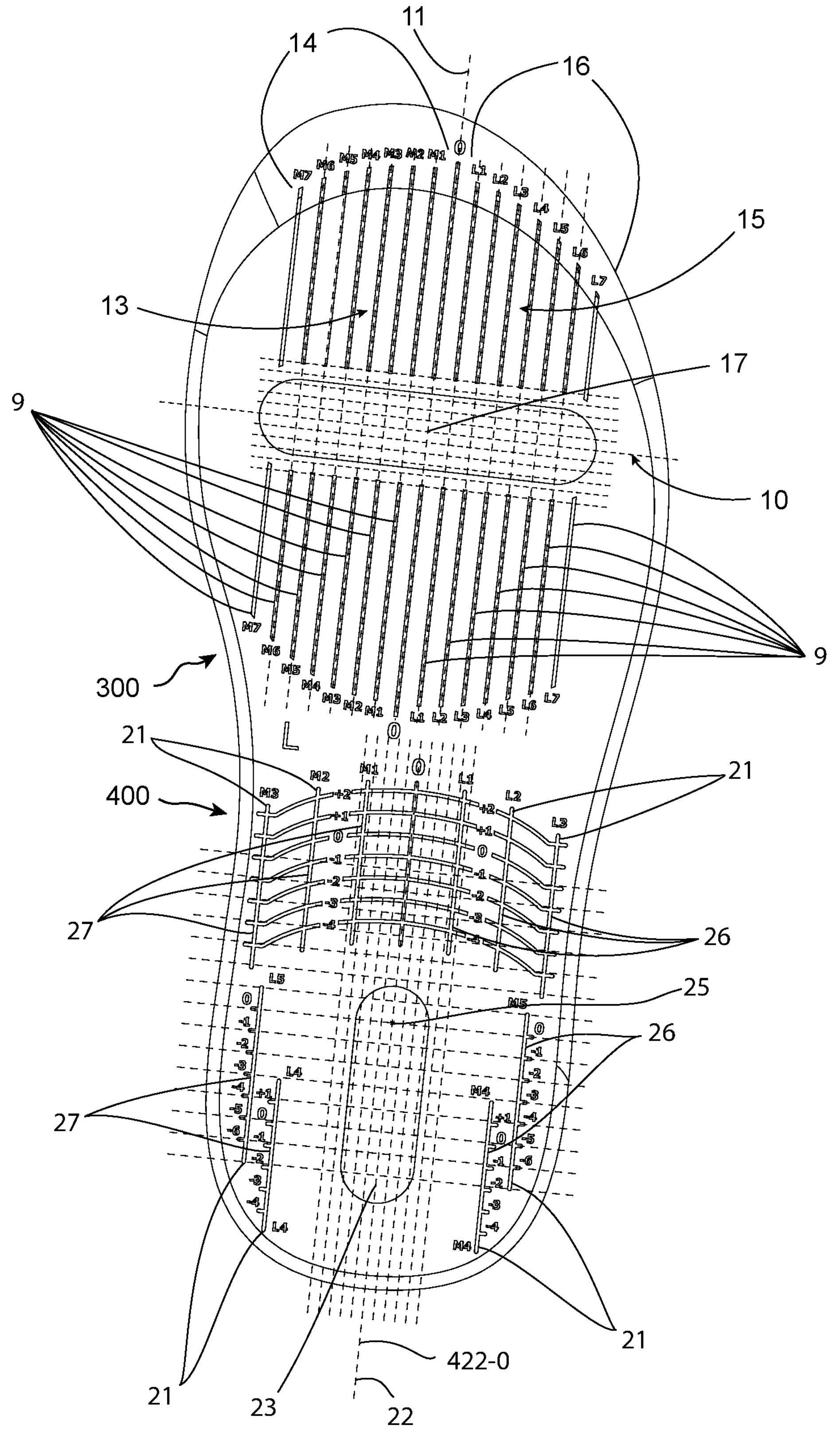

In some embodiments, such as in the embodiment depicted by FIG. 5B, the outsole map 200 comprises discrete coordinates. In some embodiments, each coordinate is unique, enabling only a single alignment position of the protuberance in respect to the outsole map. In some embodiments, outsole map 200 comprises scattered coordinates 550. In some embodiments, the scattered points 550 are non-collinear. In some embodiments, the scattered coordinates 550 of an outsole 102 vary in location on the outsole map 200 according to the desired implementation of the adjustment system. In some embodiments, the coordinates are visually suggestive to an observer as having arbitrary distribution.

Implementation of the Adjustment System

In some embodiments, at least one anterior protuberance 108 is connected to the outsole 102 via the anterior rail 204. In some embodiments, at least one posterior protuberance 106 is connected to the outsole via the posterior rail 410. In some embodiments, the anterior protuberance 108 comprises pointers 112. In some embodiments, the posterior protuberance comprises pointers 112. In some embodiments, the pointers 112 of the protuberances 104 are aligned with the outsole map 200. In some embodiments, the protuberance 104 pointers 112 are aligned with the outsole map 200 by sliding the protuberance 104 along the posterior and/or anterior rail 410/204. In some embodiments, the protuberance 104 pointers 112 are aligned with the outsole map 200 by rotating the protuberance 104.

In some embodiments, the outsole map is configured such that alignment of the protuberance with the outsole map includes a series of one or more alignments of the pointer 112 with the outsole map. For example, in some embodiments, the outsole map comprises longitudinal lines without hatch marks or scales. In some embodiments, positioning of the protuberance comprises rotating the protuberance to align one of the pointers 112 with one of the longitudinal lines, and then sliding the protuberance along the rail such that one of the pointers 112 is aligned with another one of the longitudinal lines.

In some embodiments, the outsole map is comprises one or more marked coordinates such that positioning of the protuberance in relation to the outsole includes alignments of one of the pointer 112 with one of the marked coordinates.

Positions of the Anterior Protuberance

In some embodiments, each protuberance 104 position enables a monovalent positioning in respect to the outsole map 200. In some embodiments, monovalent coding refers to a distinct position of the protuberance 104. In some embodiments, the anterior protuberance 108 is set to a neutral position. In some embodiments, the anterior protuberance 108 is shifted in the lateral direction of the outsole. In some embodiments, the anterior protuberance 108 is shifted in the medial direction of the outsole. In some embodiments, the anterior protuberance 108 is shifted in the anterior direction of the outsole. In some embodiments, the anterior protuberance 108 is shifted in the posterior direction of the outsole. In some embodiments, the anterior protuberance 108 is shifted by sliding the anterior protuberance 108 along the anterior rail 204. In some embodiments, the anterior protuberance 108 is shifted by rotating the anterior protuberance 108 about the protuberance pivot 2.

Figure 6:
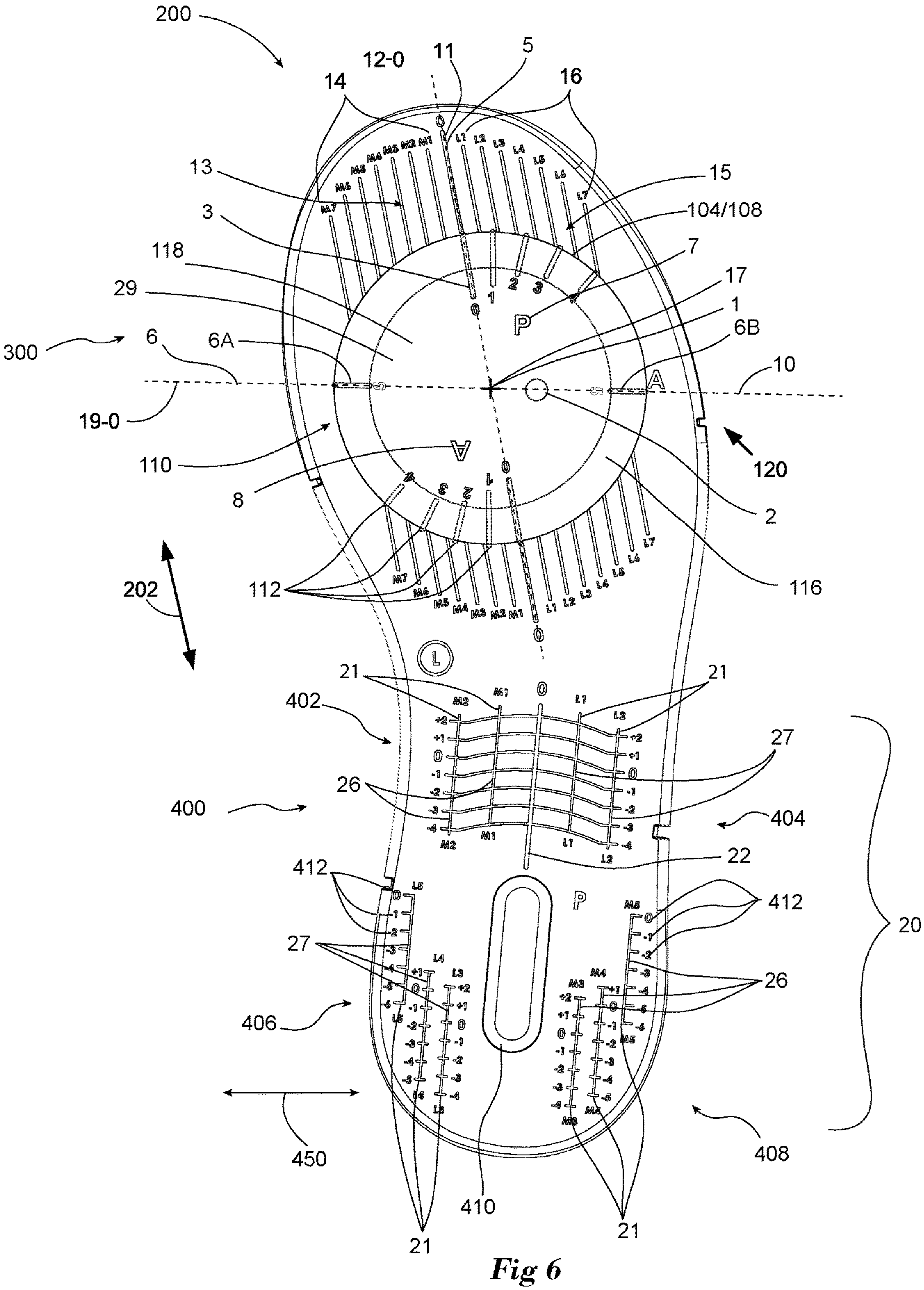
FIG. 6 is a plan view simplified illustration of an anterior protuberance in neutral position in accordance with some embodiments of the invention.

Reference is made to FIG. 6, which is a plan view simplified illustration of an anterior protuberance in neutral position in accordance with some embodiments of the invention. In some embodiments, the neutral position 29 of the anterior protuberance 108 comprises of the protuberance center 1, which coincides with an anterior origin 17 of the anterior coordinate system of the anterior outsole map 200. In some embodiments, the neutral position 29 of the anterior protuberance 108 comprises of the alignment of one alignment line 3 with the (Ma) axis 12-0. For example, in the embodiment depicted by FIG. 6, the (Ma) axis 12-0 is collinear with the anterior central alignment line 11 and with the alignment line 3 marked as no. 0.

Figure 7A:
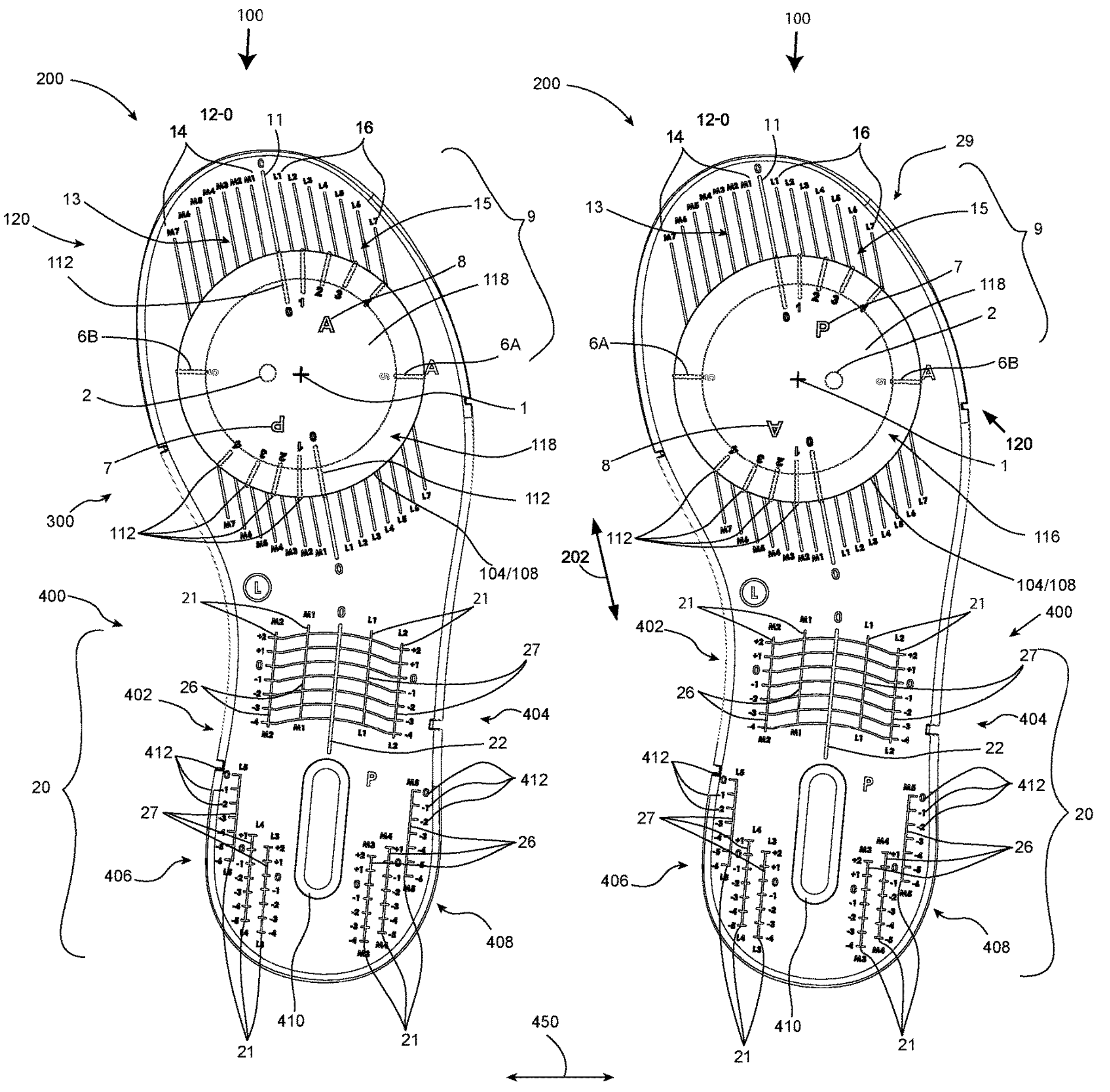
FIGS. 7A, 7B and 7C are plan view simplified illustrations of a neutral position proceeding an anterior shift of the anterior protuberance and a posterior shift of the anterior protuberance in accordance with some embodiments of the invention.
Figure 7B:
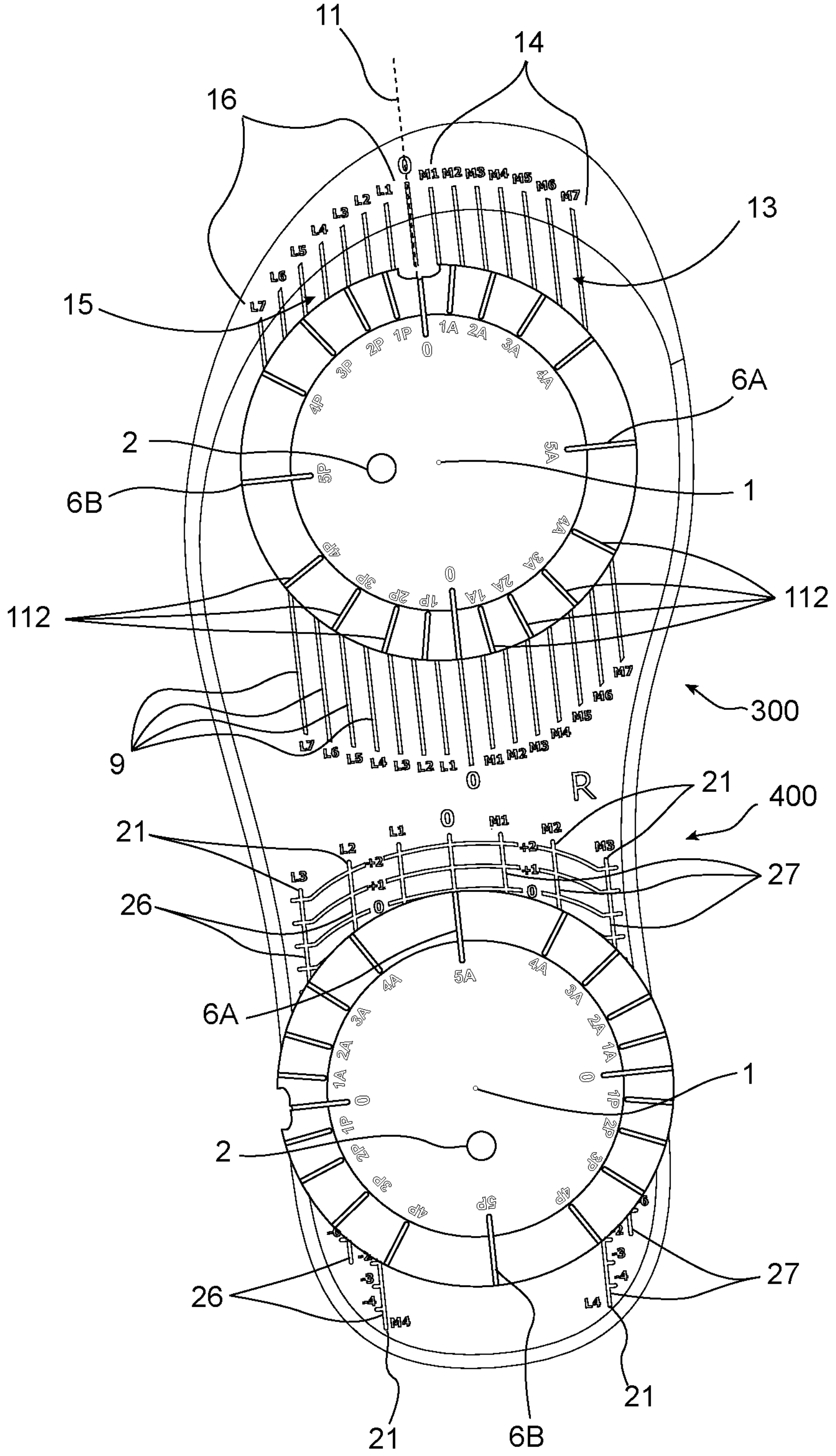
Figure 7C:
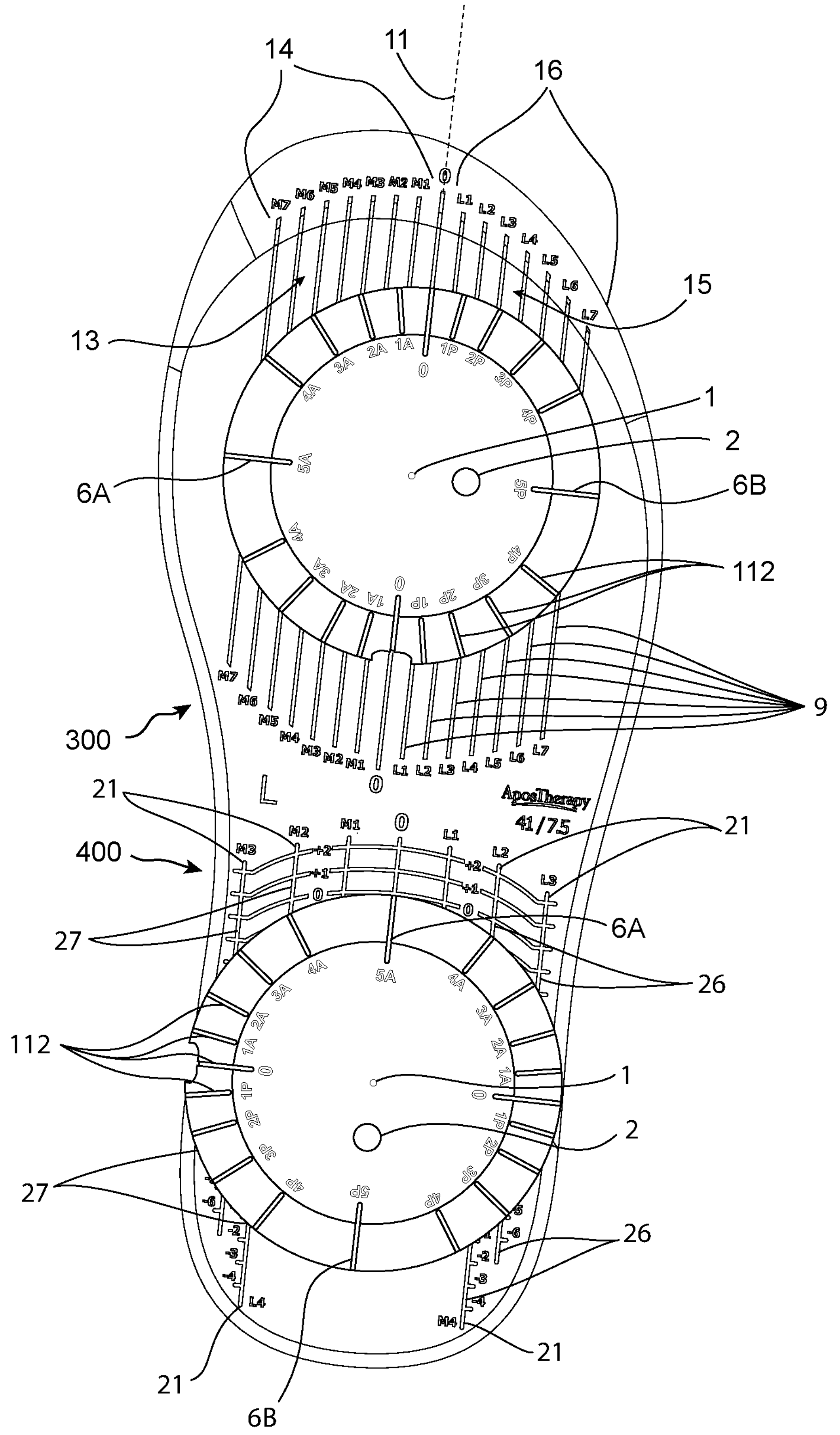

Reference is made to FIGS. 7A, 7B, and 7C which are plan view simplified illustrations a neutral position proceeding an anterior shift of the anterior protuberance or a posterior shift of the anterior protuberance in accordance with some embodiments of the invention. In some embodiments, such as depicted by FIG. 7A, the neutral position 29 of the protuberance proceeds an anterior shift of the anterior protuberance 108. In some embodiments, the protuberance pivot 2 is located at the medial side of the outsole 102 with respect to the protuberance center 1. In some embodiments, the anterior section 116 is positioned on the outsole 102 anteriorly in relation to the posterior section 118. In some embodiments, such as in the embodiment depicted by FIG. 7A, the letter A 8 marked on the protuberance is directed anteriorly in respect to the letter P 7.

In some embodiments, such as depicted by FIGS. 7B and 7C, the neutral position 29 of the protuberance proceeds a posterior shift of the anterior protuberance 108. In some embodiments, the protuberance pivot 2 is located at the lateral side with respect to the protuberance center 1. In some embodiments, the posterior section 118 is positioned on the outsole 102 anteriorly to the anterior section 116. In some embodiments, such as in the embodiment depicted by FIG. 7B, the letter P 7 marked on the protuberance 104 is directed anteriorly in respect to the letter A8.

Lateral/Medial Shifts of the Anterior Protuberance

According to some embodiments of the protuberance adjustment system 700 for footwear there is provided a method for lateral and medial shifting of the anterior protuberance. In some embodiments, the method comprises starting at the anterior protuberance neutral position 29 as explained in greater detail elsewhere herein. In some embodiments, the method comprises aligning the protuberance center 1 with the anterior origin 17 of the anterior coordinate system such that the protuberance pivot 2 is located on the lateral side with respect to the protuberance center 1. In some embodiments, the method comprises sliding the anterior protuberance 108 along the anterior rail 204 center line 10. In some embodiments, the method comprises of aligning one pointer 112 with one of the anterior longitudinal lines 9.

Figure 8:
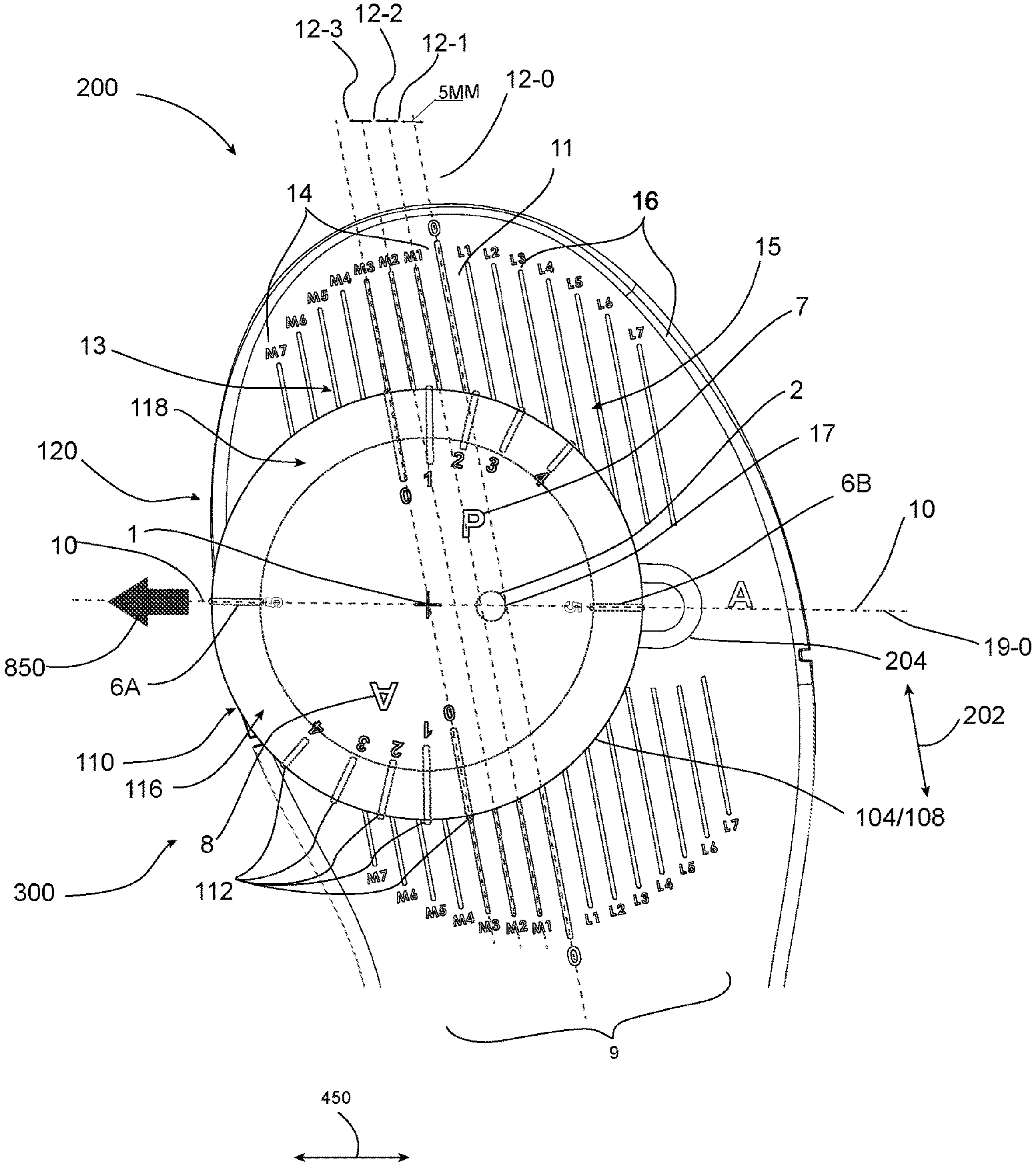
FIG. 8 is a plan view simplified illustration of a medial shift of the anterior protuberance in accordance with some embodiments of the invention.

Reference is made to FIG. 8, which is a plan view simplified illustration of a medial shift of the anterior protuberance in accordance with some embodiments of the invention. In some embodiments, the protuberance center 1 shifts along the anterior rail midline 10. For example, in the embodiment depicted by FIG. 8, the protuberance center 1 has been shifted along the anterior rail 204 from the (Ma) axis 12-0, which in this embodiment is collinear with the anterior central line 11, to an anterior longitudinal line 9 marked M3 12-3. In some embodiments, the protuberance center 1 shift along the anterior rail midline 10 in the medial direction 850. In some embodiments, the distance between two consecutive anterior longitudinal lines 9 is 0.5-10 mm. In some embodiments, shifting one pointer 112 from one anterior longitudinal line 9 to the next shifts the protuberance center 1 by 0.5-10 mm along the anterior rail midline 10. For example, in the embodiment depicted by FIG. 8 the distance between two consecutive anterior longitudinal lines 9 is 5 mm.

Posterior Shift of the Anterior Protuberance

According to some embodiments of the protuberance adjustment system for footwear there is provided a method for a posterior shift of the anterior protuberance 108. In some embodiments, the method comprises starting at the anterior protuberance neutral position 29 as explained in further detailed elsewhere herein. In some embodiments, the method comprises rotating the anterior protuberance over the protuberance pivot 2 in the posterior direction. In some embodiments, the method comprises rotating the anterior protuberance over the protuberance pivot 2 in the posterior direction such that the protuberance center 1 shifts in the posterior direction.

Figure 9:
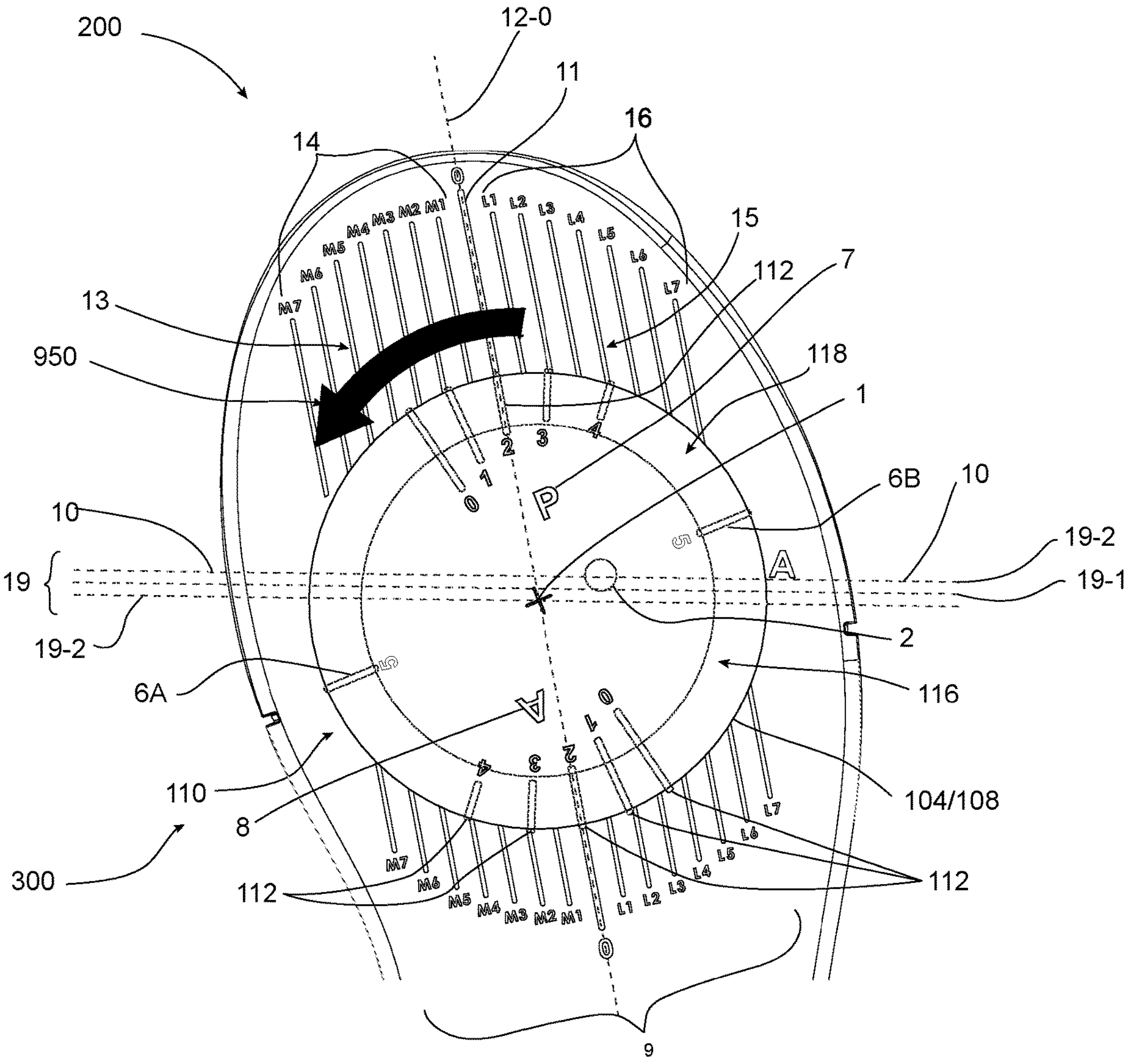
FIG. 9 is a plan view simplified illustration of a posterior shift of the anterior protuberance in accordance with some embodiments of the invention.

Reference is made to FIG. 9, which is a plan view simplified illustration of a posterior shift of the anterior protuberance in accordance with some embodiments of the invention. In some embodiments, the alignment of one pointer 112, for example the pointer 112 labeled No. 1, with the (Ma) axis 12-0 of the anterior coordinate system positions the protuberance center 1 on the (Ma) axis 12-0 1-5 mm posteriorly with respect to the (Wa) axis 19-0. In some embodiments, the alignment of one pointer 112, for example the pointer 112 labeled No. 2, with the (Ma) axis 12-0 of the anterior coordinate system positions the protuberance center 1 1-10 mm posteriorly on the (Ma) axis 12-0 with respect to the (Wa) axis 19-0. In some embodiments, the alignment of each pointer 112 with a longitudinal line 9 positions the protuberance center 1 on a latitudinal line 19. For example, in the embodiment depicted by FIG. 9, the rotation of the anterior protuberance aligns the pointer 112 labeled No. 2 with the anterior central line 11, which positions the protuberance center 1 at a latitudinal line 19-2. In some embodiments, the distance between two consecutive matrix latitudinal lines 19, e.g. 19-1 and 19-2, 1-10 mm. In some embodiments, such as depicted by FIG. 9, the distance between two consecutive matrix latitudinal lines 19 is 2 mm.

In some embodiments, the positions of the protuberance center 1 on the (Ma) axis 12-0 are obtained by rotation of the anterior protuberance 108. In some embodiments, the positions of the protuberance center 1 on the (Ma) axis 12-0 are obtained by aligning at least one of the pointers 112 with the anterior longitudinal lines 9. In some embodiments, each of the pointers 112 corresponds to a specific distance of the protuberance center 1 from the (Wa) axis 19-0. In some embodiments, the distance of the protuberance center 1 from the (Wa) axis 19-0 increases with the increase of the number of the pointer 112. In some embodiments, the distance of the protuberance center 1 from the (Wa) axis 19-0 decreases with the increase of the number of the pointer 112. In some embodiments, the difference in distance of the protuberance center 1 from the (Wa) axis 19-0 created by rotating the protuberance 104 from one pointer 112 to the proceeding pointer 112 is 1-10 mm.

In some embodiments, the difference in distance of the protuberance center 1 from the (Wa) axis 19-0 created by rotating the anterior protuberance 108 from one pointer 112 to the proceeding pointer 112 is constant. In some embodiments, the difference in distance of the protuberance center 1 from the (Wa) axis 19-0 created by rotating the anterior protuberance 108 from one alignment line 3 to the proceeding alignment line 3 varies. In some embodiments, the difference in distance of the protuberance center 1 from the (Wa) axis 19-0 created by rotating the anterior protuberance 108 from one pointer 112 to the proceeding pointer 112 increases when the rotation in counter-clockwise direction such as depicted by arrow 950.

Anterior Shift of the Anterior Protuberance

According to some embodiments of the protuberance adjustment system for footwear there is provided a method for an anterior shift of the anterior protuberance 108. In some embodiments, the method comprises starting at the protuberance neutral position 29 as explained in greater detail elsewhere herein. In some embodiments, the method comprises rotating the anterior protuberance 108 over the protuberance pivot 2 in the anterior direction. In some embodiments, the method comprises rotating the anterior protuberance 108 over the protuberance pivot 2 in the anterior direction such that the protuberance center 1 shift in the anterior direction.

Figure 10:
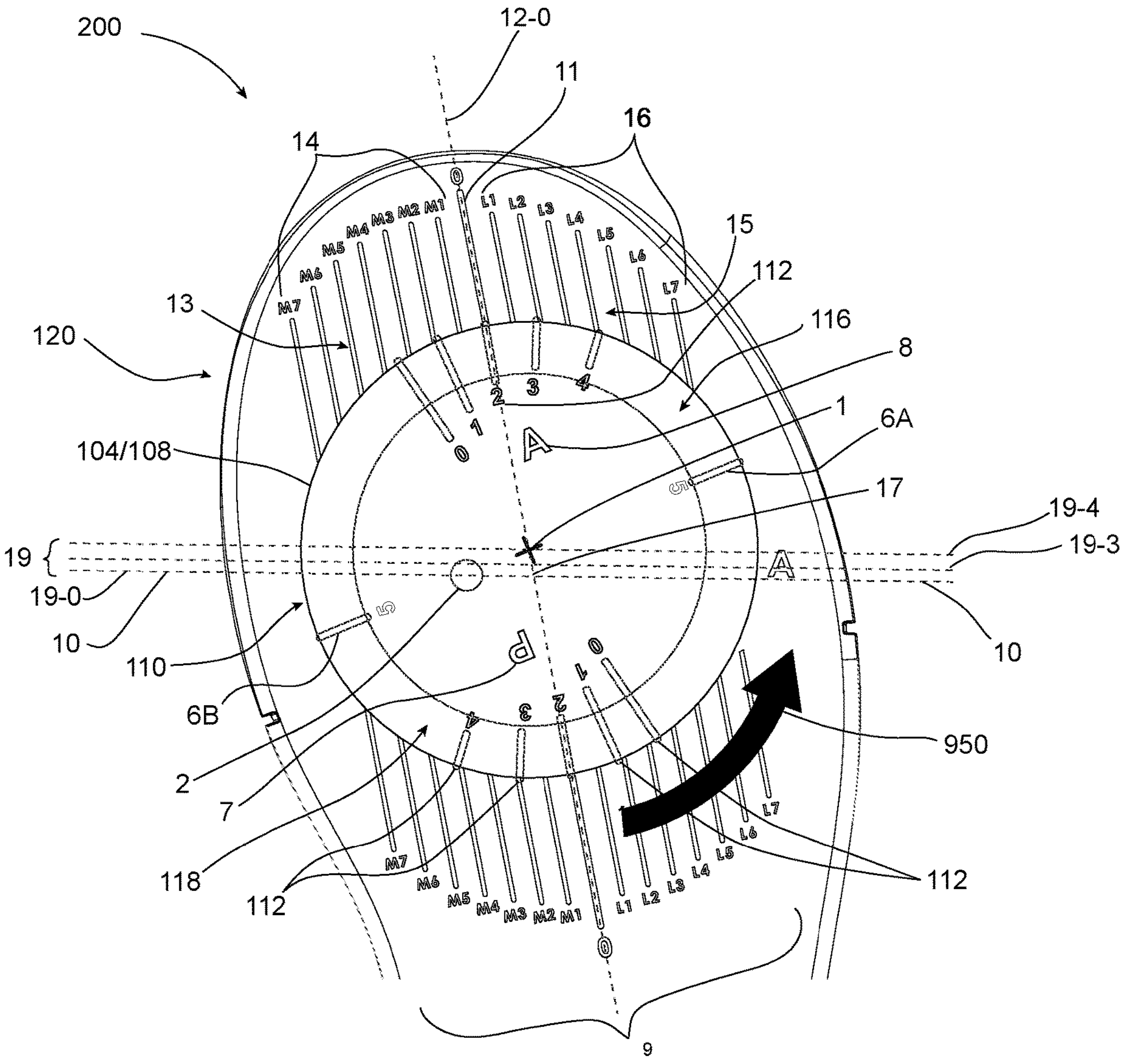
FIG. 10 is a plan view simplified illustration of an anterior shift of the anterior protuberance in accordance with some embodiments of the invention.

Reference is made to FIG. 10, which is a plan view simplified illustration of an anterior shift of the anterior protuberance in accordance with some embodiments of the invention. In some embodiments, the alignment of pointers 112, e.g., the pointer 112 labeled No. 1, with the (Ma) axis 12-0 of the anterior coordinate system, positions the protuberance center 1 on the (Ma) axis 12-0 1-5 mm anteriorly with respect to the (Wa) axis. In some embodiments, the alignment of one pointer 112, e.g., the pointer 112 labeled No. 2, with the (Ma) axis 12-0 of the anterior coordinate system, positions the protuberance center 1 1-5 mm anteriorly on the (Ma) axis 12-0 with respect to the (Wa) axis.

In some embodiments, the alignment of each proceeding pointer 112 with the (Ma) axis 12-0 positions the protuberance center 1 on the (Ma) axis 12-0 at least 1-5 mm anterior to the preceding pointer 112. For example, in the embodiment depicted by FIG. 10, the rotation of the anterior protuberance aligns the pointer 112 labeled No. 2 with the anterior central line 11, which positions the protuberance center 1 on a latitudinal line 19-4. In some embodiments, the distance between two consecutive matrix latitudinal lines 19, e.g. 19-3 and 19-, 1-10 mm. In some embodiments, such as depicted by FIG. 9, the distance between two consecutive matrix latitudinal lines 19 is 2 mm.

In some embodiments, the positions of the protuberance center 1 on the (Ma) axis 12-0 are obtained by rotation of the anterior protuberance 108. In some embodiments, the positions of the protuberance center 1 on the (Ma) axis 12-0 are obtained by aligning the alignment lines 3 with the anterior longitudinal lines 9. In some embodiments, each alignment of a pointer 112 with an anterior longitudinal line 9 corresponds to a specific distance of the protuberance center 1 from the (Wa) axis 19-0. In some embodiments, the alignment of a pointer 112, for example, the pointer 112 labeled No. 3, with one anterior longitudinal line 9, distances the protuberance center 1 from the (Wa) axis 19-0. In some embodiments, the alignment of pointer 112, for example, the pointer 112 labeled No. 3, with one anterior longitudinal line 9, opposes the protuberance centric point 1 from the (Wa) axis 19-0. In some embodiments, the difference in distance of the protuberance center 1 from the (Wa) axis 19-0 created by rotating the protuberance from one pointer 112 to the proceeding pointer 112 is 1-10 mm.

In some embodiments, the difference in distance of the protuberance center 1 from the (Wa) axis 19-0 created by rotating the protuberance from one pointer 112 to the proceeding pointer 112 is constant. In some embodiments, the difference in distance of the protuberance center 1 from the (Wa) axis 19-0 created by rotating the protuberance from one pointer 112 to the proceeding pointer 112 varies. In some embodiments, the difference in distance of the protuberance center 1 from the (Wa) axis 19-0 created by rotating the protuberance from one pointer 112 to the pointer 112 increases when the rotation in counter-clockwise direction such as depicted by arrow 950.

Combined Posterior/Anterior and Lateral/Medial Shifts of the Anterior Protuberance According to some embodiments of the protuberance adjustment system for footwear there is provided a method for combined shift of an anterior protuberance. In some embodiments, a combined shift comprises of a posterior and a lateral shift. In some embodiments, a combined shift comprises of an anterior and a lateral shift. In some embodiments, a combined shift comprises of a posterior and a medial shift. In some embodiments, a combined shift comprises of an anterior and a medial shift. In some embodiments, the method comprises starting with the anterior protuberance 108 in the neutral position 29, such as described in greater detail elsewhere herein. In some embodiments, the method comprises sliding the anterior protuberance 108 along the anterior rail 204. In some embodiments, the method comprises rotating the anterior protuberance 108 about the protuberance pivot 2. In some embodiments, the method comprises both sliding the anterior protuberance 108 along the anterior rail 204 and rotating the anterior protuberance 108 about the protuberance pivot 2.

Figure 11:
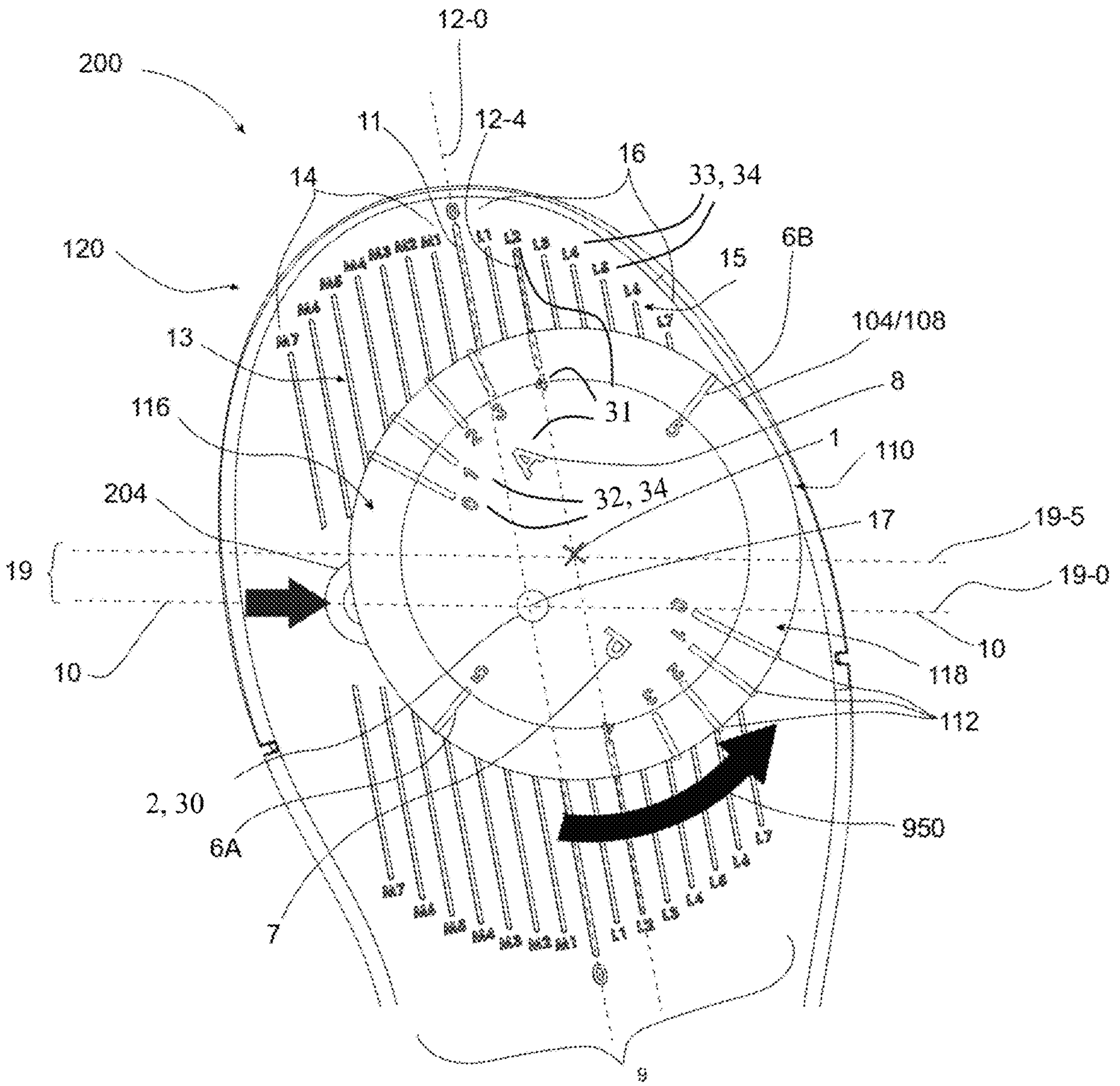
FIG. 11 is a plan view simplified illustration of a combined shift in accordance with some embodiments of the invention.

Reference is made to FIG. 11, which is a plan view simplified illustration of a combined shift in accordance with some embodiments of the invention. In some embodiments, the method comprises combined shifting and sliding until the protuberance pivot 2 is located in the desired position (e.g., identified by unique code 31). In some embodiments, the method comprises combined shifting and sliding until a chosen pointer 112 is aligned with a chosen anterior longitudinal line 9. For example, in the embodiment depicted by FIG. 11, the pointer labeled No. 4 (e.g., having pointer identifier 32 comprising mark 34 "4") is aligned with the anterior longitudinal line 9 marked L2 (e.g., having longitudinal line identifier 33 comprising mark 34 "L2"), which positions the protuberance center 1 on the intersection of a longitudinal line 12-4 and a latitudinal line 19-5 (thereby, unique code 31 may be read as "A-4-L2").

Position of the Posterior Protuberance

Figure 12:
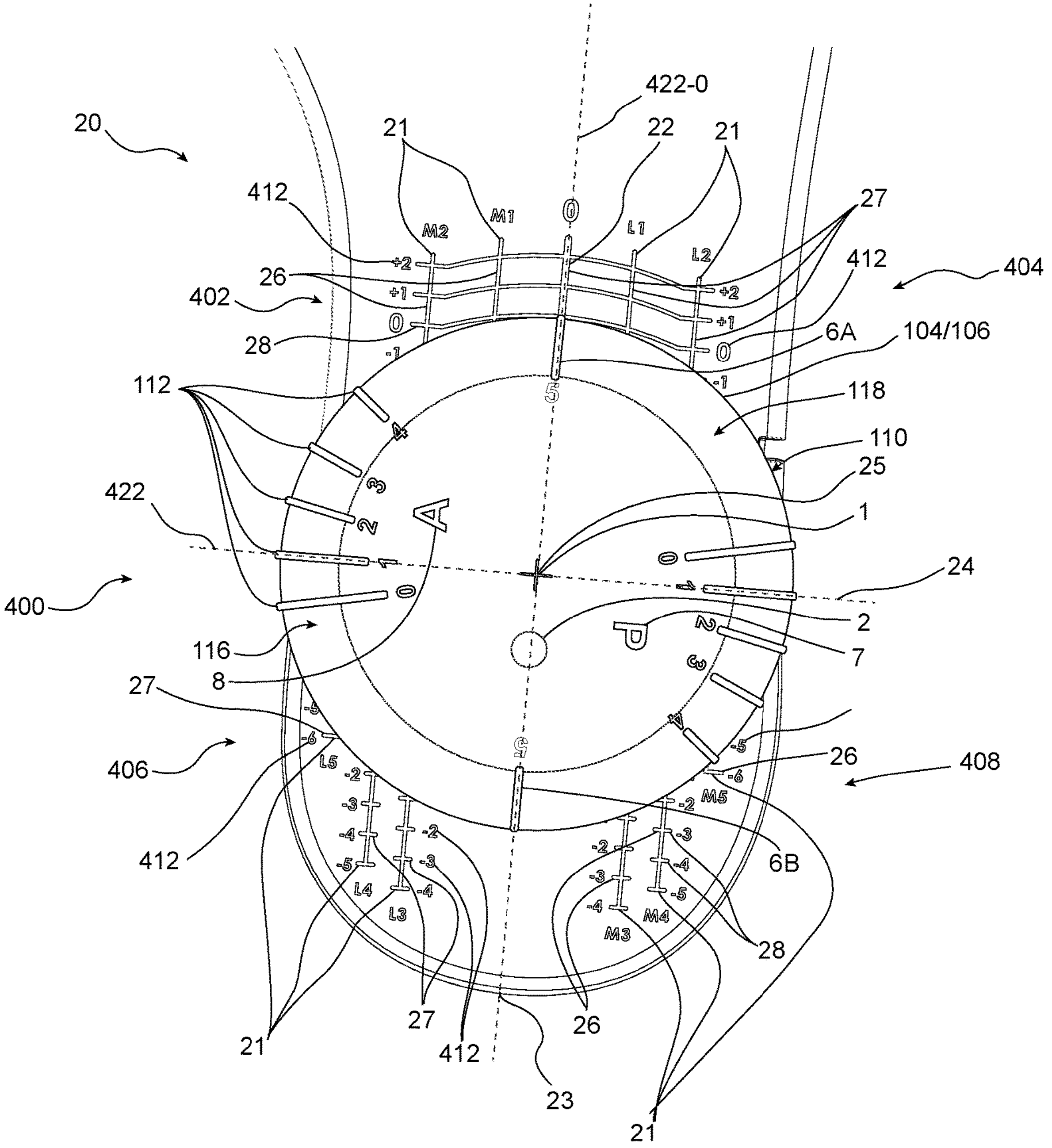
FIG. 12 is a plan view simplified illustration of a posterior protuberance in neutral position in accordance with some embodiments of the invention.

Reference is made to FIG. 12, which is a plan view simplified illustration of a posterior protuberance in neutral position in accordance with some embodiments of the invention. In some embodiments, the neutral position is the initial protuberance position before adjustments are made to the position of the protuberance. In some embodiments, the neutral position of the posterior protuberance 106 comprises the protuberance center 1, which coincides with the posterior origin 25 of the posterior coordinate system 20 of the posterior outsole map 400. In some embodiments, the neutral position of the posterior protuberance 106 comprises of the alignment of the midline pointer 6 with one of the posterior rail midline 23 and/or the ML center line 22. In some embodiments, the posterior protuberance 106 is positioned by alignment of the midline pointer 6 with the marks of the posterior coordinate system 20 of the posterior outsole map 400. In some embodiments, the protuberance 106 is aligned with a hatch mark 28. In some embodiments, the hatch mark 28 is marked with a scale 412. In some embodiments, the neutral position of the protuberance 106 comprises aligning the protuberance 106 with a hatch mark 28 labeled by the scale 412 as neutral, e.g. marked N, marked No. 0.

Lateral Shift of the Posterior Protuberance

Reference is made to FIG. 13, which is a plan view simplified illustration of a lateral shift of the posterior protuberance in accordance with some embodiments of the invention. According to some embodiments of the protuberance adjustment system for footwear there is provided a method for lateral shifting of the posterior protuberance 106. In some embodiments, the method comprises starting with the posterior protuberance 106 in the neutral position, such as described in greater detail elsewhere herein. In some embodiments, the method comprises rotating the posterior protuberance 106 about the protuberance pivot 2. In some embodiments, the method comprises placing at least one of the midline pointers 6 in the lateral-anterior quadrant 404 and the medial-posterior quadrant 408.

In some embodiments, the method comprises rotating the posterior protuberance 106 into a position where the first midline pointer 6A is in the lateral-anterior quadrant 404. In some embodiments, the method comprises rotating the protuberance into a position where the second midline pointer 6B is in the medial-posterior quadrant 406. In some embodiments, the method comprises rotating the posterior protuberance to align the midline pointers 6 with the posterior coordinate system 20. In some embodiments, the method comprises rotating the posterior protuberance 106 to align the midline pointers 6 with at least one laterally shifting line 27. In some embodiments, the method comprises rotating the posterior protuberance 106 to align the midline pointers 6 with at least one of the hatch marks 28 of a laterally shifting line 27. In some embodiments, the transition of a midline pointer 6 from one laterally shifting line 27 to the next results in a 1-5 mm transverse shift of the protuberance center 1 in the direction of movement.

Figure 13A:
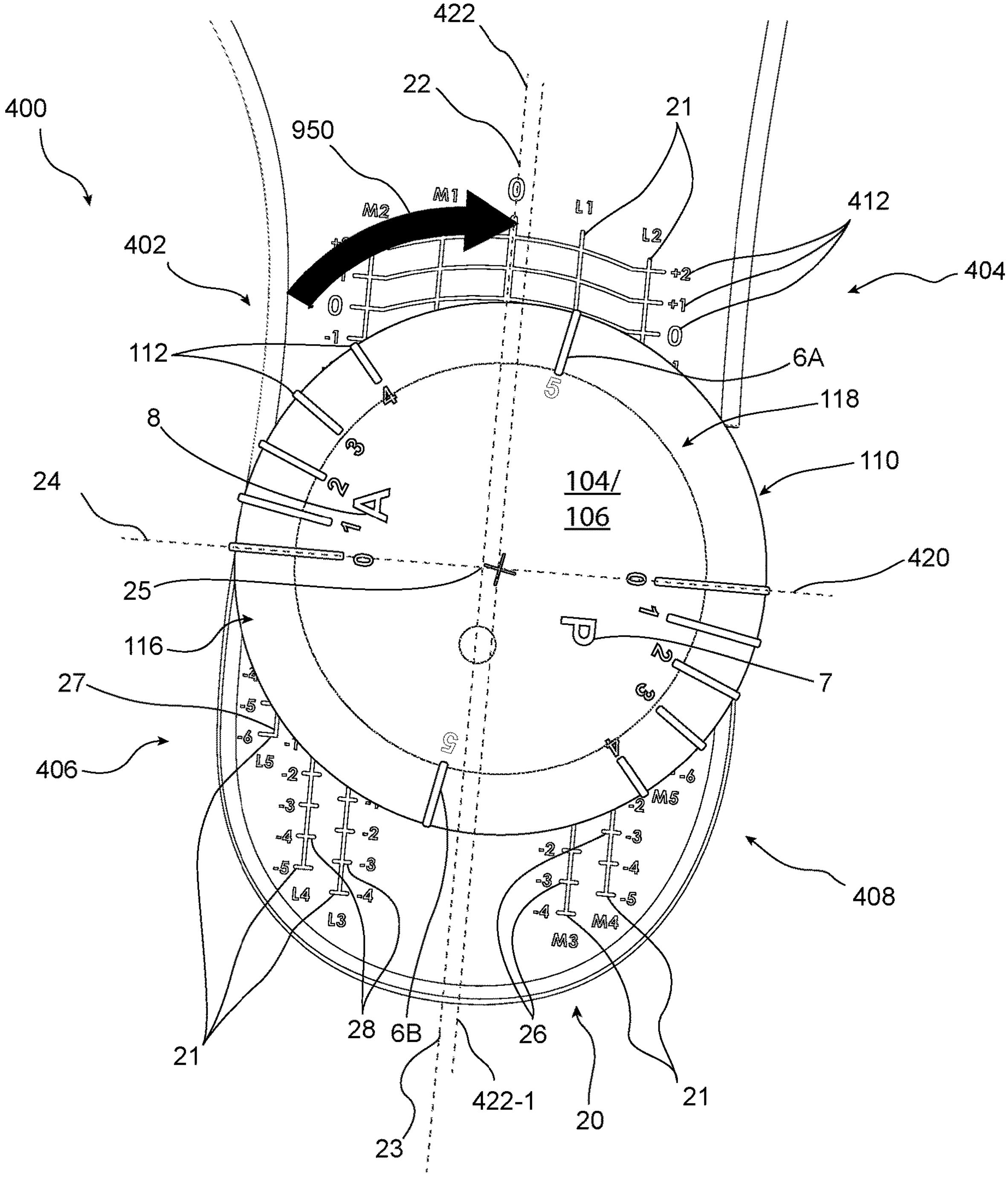
FIGS. 13A and 13B are plan view simplified illustrations of a lateral shift of the posterior protuberance in accordance with some embodiments of the invention.
Figure 13B:
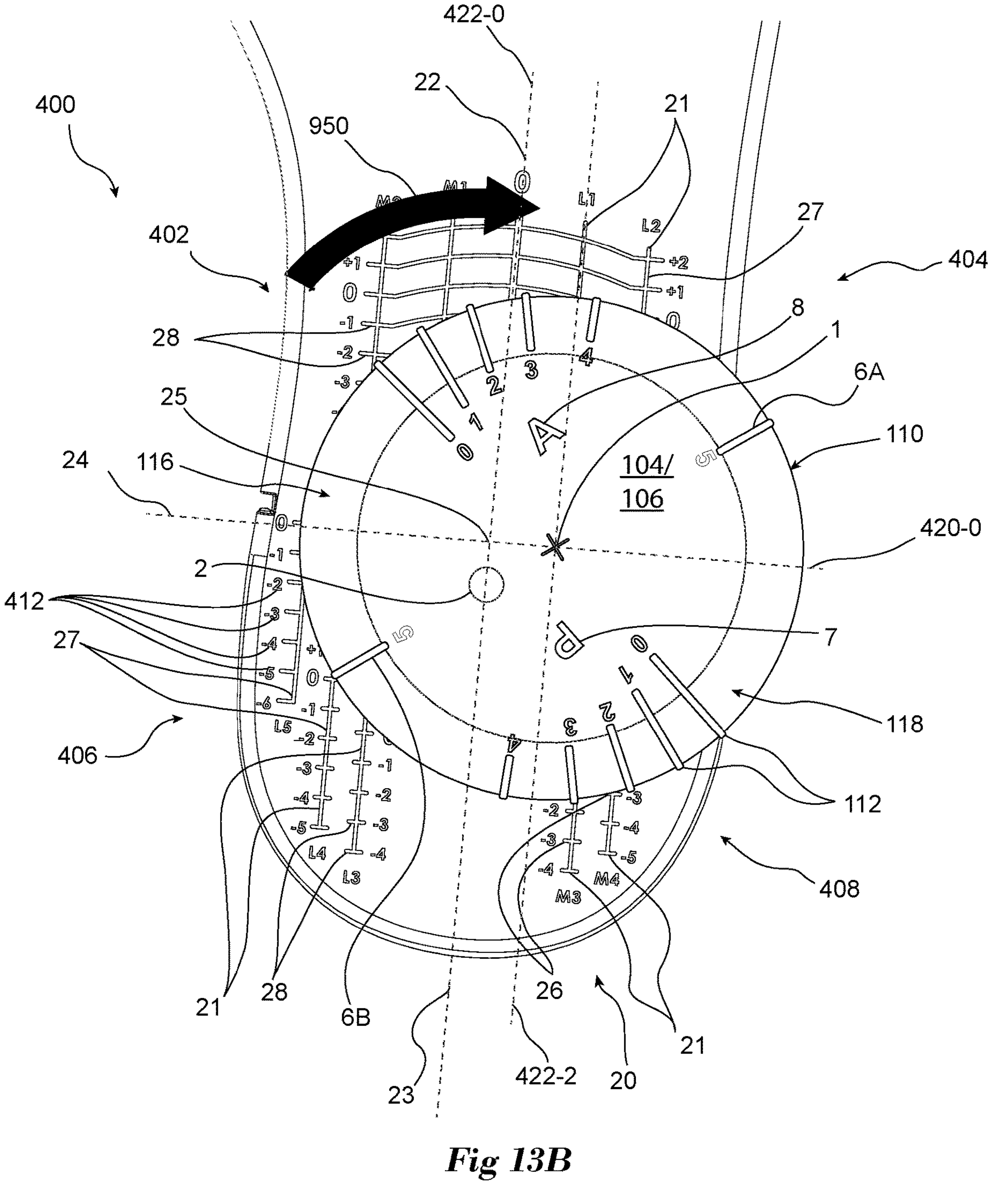

For example, in the embodiment depicted by FIG. 13A, the shift of the posterior protuberance aligns the first midline pointer 6A marked No. 5 with the posterior longitudinal line 21 marked L1 and hatch mark 28 marked No. 0 (Zero), on the lateral-anterior quadrant 404, which positions the protuberance center 1 on a posterior longitudinal line 422-1. In another example, the embodiment depicted by FIG. 13B shows that the shift of the posterior protuberance aligns the second midline pointer 6B marked No. 5 with the posterior longitudinal line 21 marked L4 and hatch mark 28 marked No. 0, on the medial-posterior quadrant 406, which positions the protuberance center 1 on a posterior longitudinal line 422-2.

In some embodiments, one or more of the anterior outsole map and the posterior outsole map comprise longitudinal lines that are unmarked, or in other words, do not have one or more hatch marks along the length of the longitudinal line.

Medial Shift of the Posterior Protuberance

Reference is made to FIG. 14, which is a plan view simplified illustration of a medial shift of the posterior protuberance in accordance with some embodiments of the invention. According to some embodiments of the protuberance adjustment system for footwear there is provided a method for medial shifting of the posterior protuberance. In some embodiments, the method comprises starting with the posterior protuberance in the neutral position, such as described in greater detail elsewhere herein.

In some embodiments, the method comprises rotating the posterior protuberance about the protuberance pivot 2. In some embodiments, the method comprises placing the midline pointers 6 in the medial-anterior quadrant and the lateral-posterior quadrant. In some embodiments, the method comprises placing the midline pointers 6 in the medial-anterior quadrant and the lateral-posterior quadrant. In some embodiments, the method comprises rotating the posterior protuberance into a position where the first midline pointer 6A is in the medial-anterior quadrant.

In some embodiments, the method comprises rotating the protuberance into a position where the first midline pointer 6A is in the medial-anterior quadrant 402. In some embodiments, the method comprises rotating the protuberance into a position where the second midline pointer 6B is in the lateral-posterior quadrant 408. In some embodiments, the method comprises rotating the posterior protuberance to align the midline pointers 6 with the posterior coordinate system 20. In some embodiments, the method comprises rotating the posterior protuberance to align the midline pointers 6 with at least one medially shifting line 26. In some embodiments, the method comprises rotating the posterior protuberance to align the midline pointers 6 with at least one of the hatch marks 28 on a medially shifting line 26. In some embodiments, transition of a midline pointer 6 moving from one medially shifting line 26 to the next results in a 1-5 mm transverse shift of the protuberance center 1 in the direction of movement.

Figure 14A:
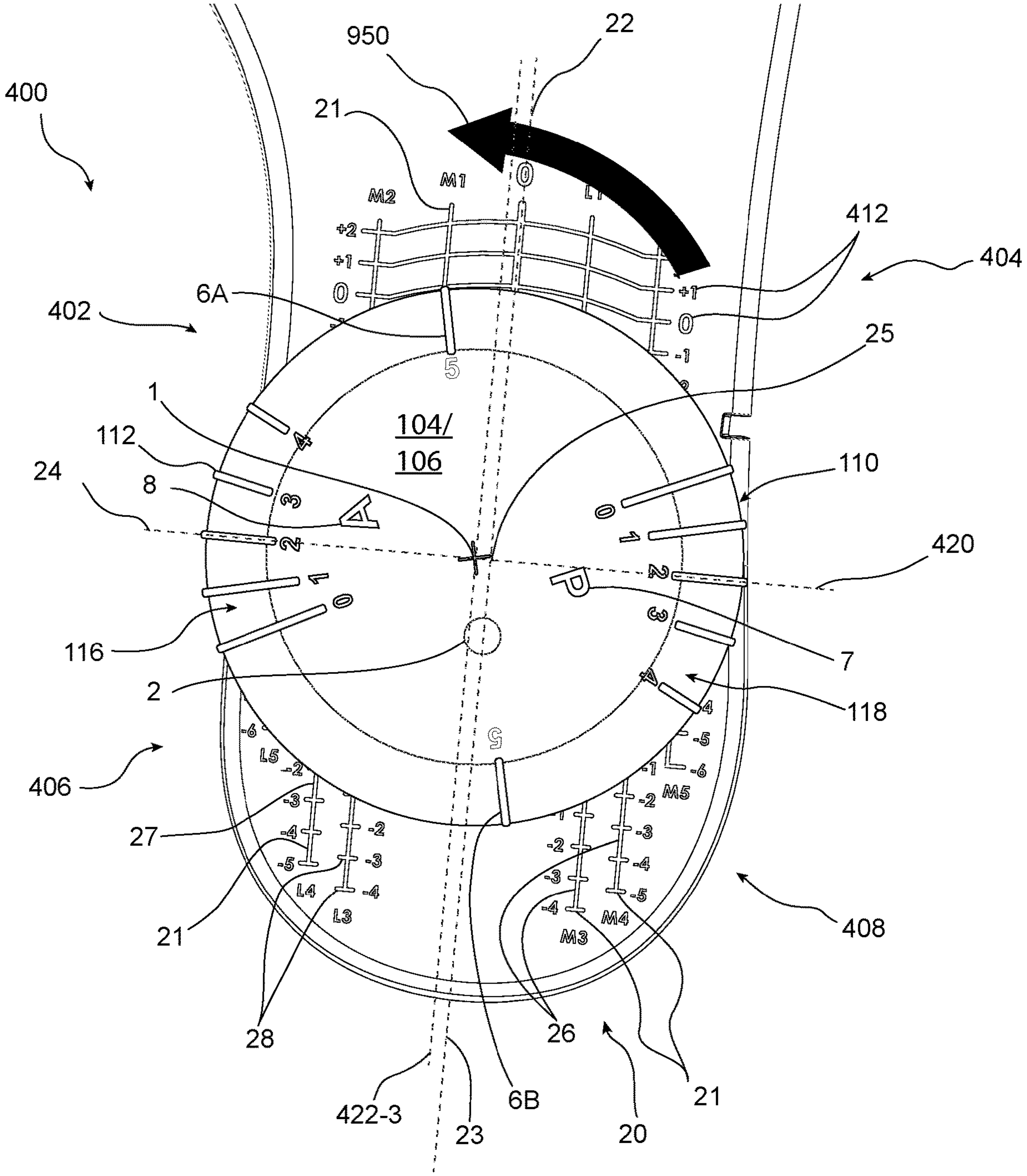
FIGS. 14A and 14B are plan view simplified illustrations of a medial shift of the posterior protuberance in accordance with some embodiments of the invention.
Figure 14B:
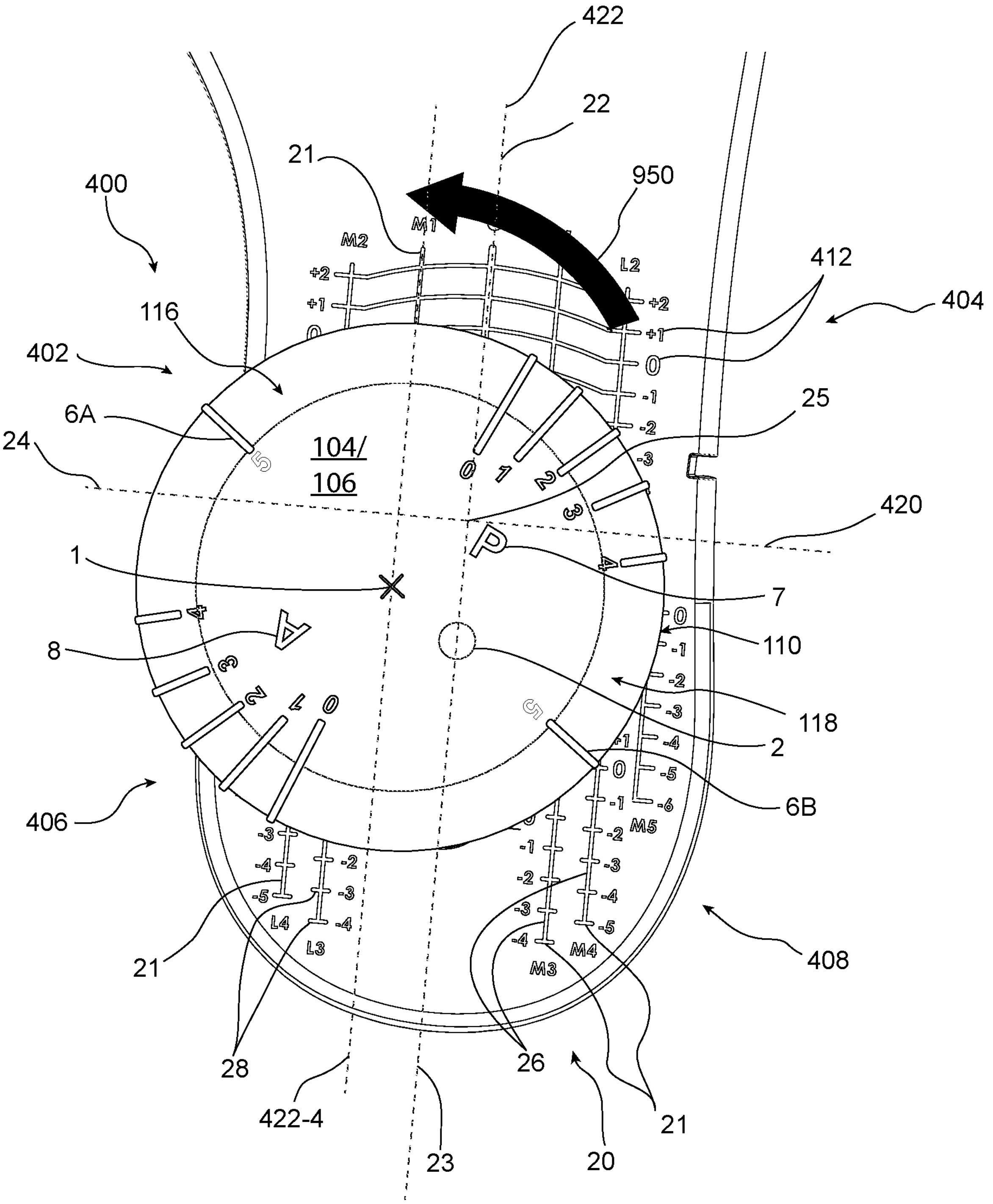

For example, in the embodiment depicted by FIG. 14A, the shift of the posterior protuberance aligns the first midline pointer 6A marked No. 5 with the posterior longitudinal line 21 marked M1 and hatch mark 28 marked No. 0, on the medial-anterior quadrant 402, which positions the protuberance center 1 on a posterior longitudinal line 422-3. In another example, the embodiment depicted by FIG. 14B shows that the shift of the posterior protuberance aligns the second midline pointer 6B marked No. 5 with the posterior longitudinal line 21 marked M4 and hatch mark 28 marked No. 0, on the medial-posterior quadrant 408, which positions the protuberance center 1 on a posterior longitudinal line 422-4.

Anterior/Posterior Shifts of the Posterior Protuberance

Figure 15:
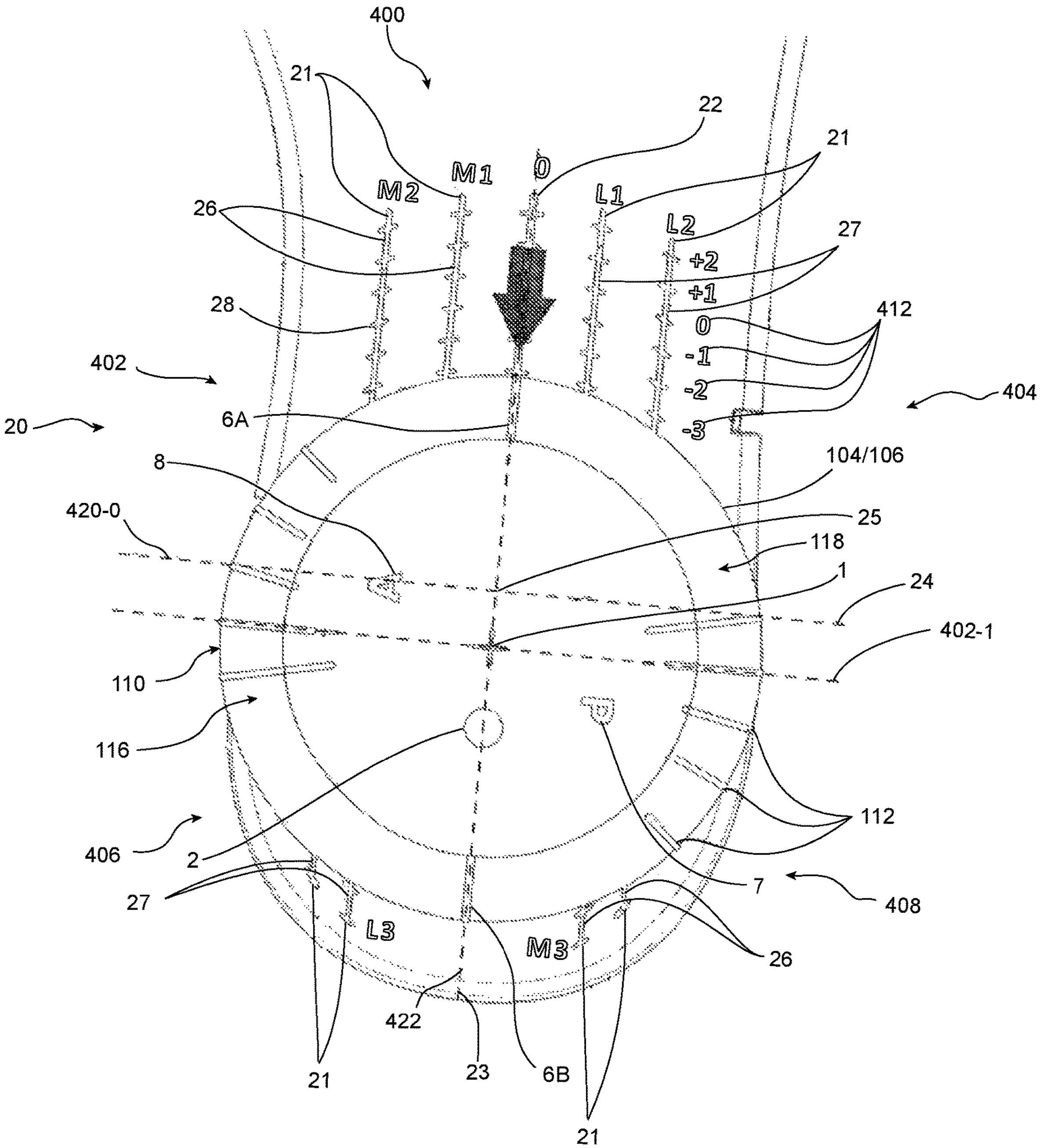
FIG. 15 is a plan view simplified illustration of an anterior-posterior shift of the posterior protuberance in accordance with some embodiments of the invention.

Reference is made to FIG. 15, which is a plan view simplified illustration of an anterior-posterior shift of the posterior protuberance in accordance with some embodiments of the invention. According to some embodiments of the protuberance adjustment system for footwear 100 there is provided a method for anterior and posterior shifting of the posterior protuberance 106. In some embodiments, the method comprises starting with the posterior protuberance 106 in the neutral position, such as described in greater detail elsewhere herein. In some embodiments, the method comprises aligning the midline pointers 6 with the posterior rail midline 23. In some embodiments, the posterior rail midline 23 comprises hatch marks 28. In some embodiments, the method comprises aligning the midline pointers 6 with the hatch marks 28 of the ML center line 22. In some embodiments, shifting the midline pointer 6 from one hatch mark 28 to the proceeding hatch mark 28 creates a 1-7 mm longitudinal shift of the protuberance center 1 in the selected direction.

For example, in the embodiment depicted by FIG. 15, the shift of the posterior protuberance aligns the first midline pointer 6A marked No. 5 with the ML central line 22 and hatch mark 28 marked No. −2, which positions the protuberance center 1 on a posterior latitudinal line 420-1.

Figure 16:
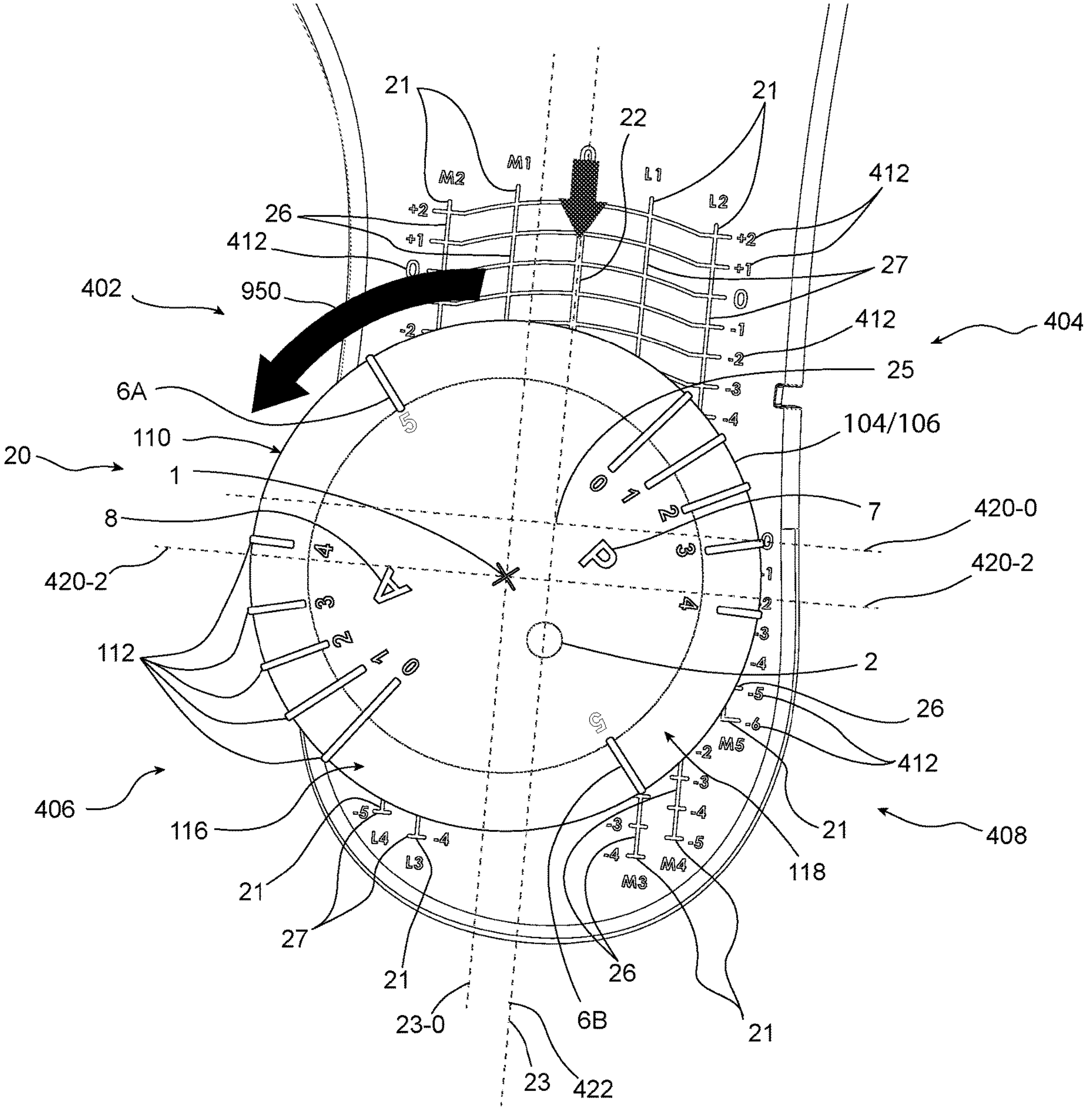
FIG. 16 is a plan view simplified illustration of one embodiment of a combined shift of a posterior protuberance in accordance with some embodiments of the invention.

Combined Posterior/Anterior and Lateral/Medial Shifts of the Posterior Protuberance Reference is made to FIG. 16, which is a plan view simplified illustration of a combined shift of a posterior protuberance in accordance with some embodiments of the invention. According to some embodiments of the protuberance adjustment system for footwear 100 there is provided a method for a combined shift of the posterior protuberance 106. In some embodiments, a combined shift comprises of a posterior and a lateral shift. In some embodiments, a combined shift comprises of an anterior and a lateral shift. In some embodiments, a combined shift comprises of a posterior and a medial shift. In some embodiments, a combined shift comprises of an anterior and a medial shift.

In some embodiments, the method comprises starting with the posterior protuberance 106 in the neutral position, such as described in greater detail elsewhere herein. In some embodiments, the method comprises sliding the posterior protuberance 106 along the posterior rail 410. In some embodiments, the method comprises rotating the posterior protuberance 106 about the protuberance pivot 2. In some embodiments, the method comprises both sliding the posterior protuberance along the posterior rail and rotating the posterior protuberance about the protuberance pivot 2. In some embodiments, the method comprises aligning one of the pointers 112 with one of the markings of the posterior outsole map 400. In some embodiments, the method comprises aligning the midline pointer 6 pointer 112 with one of the markings of the posterior outsole map 400.

For example, in the embodiment depicted by FIG. 16, the shift of the posterior protuberance aligns the second midline pointer 6B marked No. 5 with the posterior longitudinal line 21 marked M3 and hatch mark 28 marked No. −2, on the lateral-posterior quadrant 408, which positions the protuberance center 1 on the intersection of a longitudinal line 23*e* and a posterior latitudinal line 420-2.

Protuberance Alignment

In some embodiments, an alignment of a specific pointer 112 with a specific coordinate point of the outsole map 200 is configured to place the protuberance center 1 in a predetermined position in respect to the outsole 102. In some embodiments, the predetermined position of the protuberance center 1 is located on the outsole 102.

In some embodiments, an alignment of a specific pointer 112 with a specific coordinate point of the outsole map 200 is determined by a position of the protuberance 104 along a rail. In some embodiments, the rail limits the range of movement of the protuberance pivot 2. In some embodiments, a specific pointer 112 is aligned with a specific coordinate point of the outsole map 200 by rotation of the protuberance 104 about the protuberance pivot 2.

In some embodiments, the position of the protuberance center 1 on the outsole 102 is determined by its distance from the protuberance pivot 2 and the size of the rail. For example, in some embodiments, the distance and the size of the rail are such that maintain the protuberance center 1 inside the outsole 102.

In some embodiments, the distance between the protuberance center 1 and the protuberance pivot is L. Therefore, the rotation of the protuberance 104 about the protuberance pivot 2 allows aligning the protuberance concentric point 1 with any one of a set of coordinate points of the outsole map 200 that are at a distance L from the protuberance pivot 2. A potential advantage of this configuration is in that it provides an extensive range of alignment positions of the protuberance center 1 in respect to the outsole map 200.

In some embodiments, such as depicted in FIG. 7C, the midline pointers 6A and 6B are configured to align with different portions of the outsole map 200. For example, in some embodiments, the first midline pointer 6A is configured to align with M3 to L3 and the second midline pointer 6B is configured to align with the lines M4, M5, L4 and L5 of the posterior outsole map 400.

Positioning Code

Reference is made to FIGS. 17A and 17B, which together are a table of position codes (e.g., such as code 31, shown in FIG. 11) in accordance with some embodiments of the invention. According to some embodiments of the protuberance adjustment system for footwear there is provided a position code. In some embodiments, the position code comprises of a set monovalent calibration positions for a protuberance 104. In some embodiments, the position code comprises of a set monovalent calibration positions for an anterior protuberance 108. In some embodiments, the position code comprises of a set monovalent calibration positions for a posterior protuberance 106. In some embodiments, the position code comprises a set of monovalent calibration positions for the right and/or left foot. In some embodiments, the position code comprises positions of the protuberance 104 on the outsole map 200. In some embodiments, the position code corresponds between the position of the protuberance on the outsole and an orthopedic treatment.

In some embodiments, the position code defines the protuberance location. In some embodiments, the protuberance location code defines the location of at least one of the anterior left (AL), anterior right (AR), posterior left (PL), or posterior right (PR) protuberance. In some embodiments, the position code defines the protuberance diameter. In some embodiments, the protuberance diameter is or more of 85 mm, 90 mm, 95 mm. In some embodiments, the position code defines the protuberance profile. In some embodiments, the protuberance profiles are labeled A, B, C, D. In some embodiments, the position code defines the protuberance hardness.

In some embodiments, the position code defines the protuberance center 1 position in relation to the anterior rail midline 10. In some embodiments, the position code defines the protuberance center 1 position in relation to at least one of the posterior rail midline 23 and the ML center line 22. In some embodiments, the position code defines which alignment line 3 pointer 112 is aligned with the outsole map 200. In some embodiments, the position code defines what part of the outsole map 200 the alignment line 3 pointer 112 is aligned with.

Figure 18A:
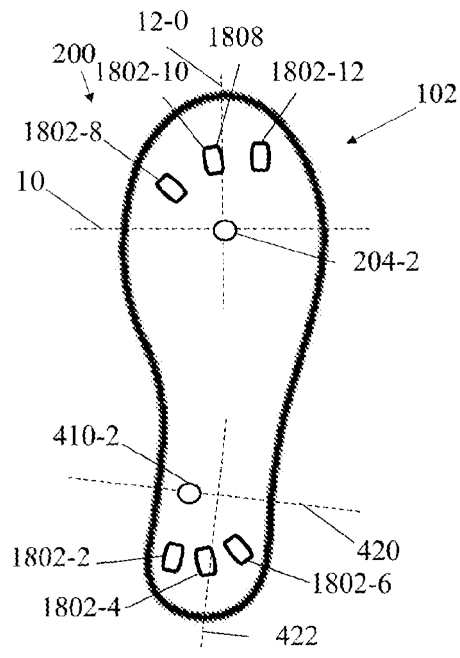
FIG. 18A-18F are plan view simplified illustrations of a protuberance adjustment system comprising at least one lock and key system in accordance with some embodiments of the invention.
Figure 18B:
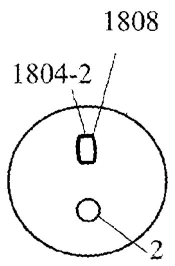
Figure 18C:
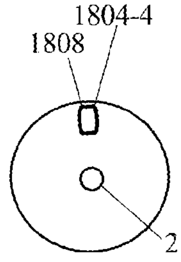
Figure 18D:
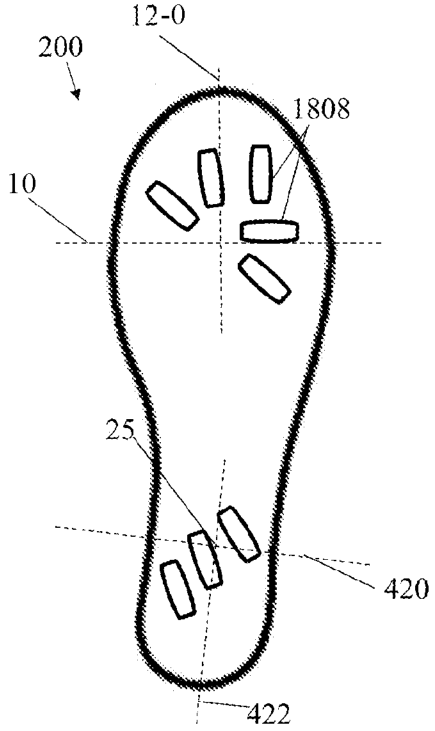
Figure 18E:
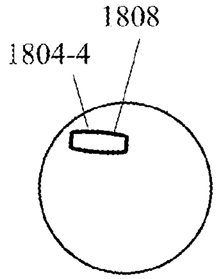
Figure 18F:
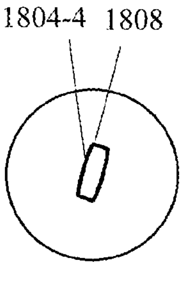

FIG. 17C, is a code line of position codes generated for a specific individual in accordance with some embodiments of the invention. In one implementation of the invention, a professional examines a subject and produces a position code configured to right a fault in a subject diagnosed by the professional. In some embodiments, a protuberance position code is generated automatically, for example, by a gait diagnosis system including, for example, a treadmill, an imager and a computer to improve performance of a healthy subject, for example, in sports. Reference is made to FIG. 18A-C, which are plan view simplified illustrations of a protuberance adjustment system in accordance with some embodiments of the invention.

In some embodiments the protuberance adjustment system comprises at least one lock and key system 1808. In some embodiments, the lock and key system 1808 couples the outsole 102 and the protuberance 104. In some embodiments, the outsole 102 comprises an outsole component 1802 of the lock and key system 1808. In some embodiments, the protuberance 104 comprises a protuberance component 1804 of the lock and key system 1808. In some embodiments, the outsole component 1802 and the protuberance component 1804 are the lock and key system 1808 of the protuberance adjustment system 700.

In some embodiments, the lock and key system 1808 comprises a socket and a corresponding plug, e.g., a socket 1802-8 and plug 1804-2 or, alternatively and optionally, a socket 1804-2 and plug 1802-8. In some embodiments, the lock and key system components are a pin and bore, e.g., pin 1804-2 and bore 1802-8 or, alternatively and optionally, pin 1802-8 and bore 1808-4.

In some embodiments, the protuberance component 1804 is positioned eccentrically on the protuberance 104. In some embodiments, the protuberance component 1804 is positioned concentrically with the protuberance 104. In some embodiments, a position of an outsole component 1802 is derived from a range of code lines, e.g., an averaged code line based on the range of code lines. Correspondingly, a position of a protuberance 104 lock and key component (e.g., lock and key component 1804-2) is derived from a range of code lines, e.g., an averaged code line based on the range of code lines.

In this embodiment, the code map is integrated into the predetermined position of the lock and key components 1802/1804 negating the need to mark the outsole map 200 and/or pointers 112 and/or alignment lines 3 on protuberance 104. A potential advantage of this configuration is in that a lock and key position is not patient specific and is suitable for several users or user types.

In some embodiments, the outsole component 1802 is positioned at a predetermined position of the outsole 102 in accordance with the code line and/or coding map 200. In some embodiments, the outsole 102 comprises a plurality of outsole components 1802. In some embodiments, the protuberance adjustment system comprises a plurality of protuberances 104 comprising distinct positions of the protuberance components 1804 in relation to the protuberance center 1 of the protuberance 104.

In some embodiments, the outsole components 1802 and the protuberance component 1804 are positioned to correspond to one or more positions in accordance with the position code (FIG. 17). In some embodiments, the outsole components 1802 and the protuberance component 1804 are positioned to correspond to a range of positions in accordance with the position code. For example, in some embodiments one outsole component 1802 corresponds with the range of positions of protuberance 104 in which one pointer 112 of the protuberance 104 is aligned in accordance with a plurality of consecutive coordinates based on a generated outsole map 200. In some embodiments, an outsole component 1802 coupled to a protuberance component 1804 corresponds with a range of positions based on the positioning code.

In some embodiments, the protuberance 104/104-2/104-3 pointers 112 are invisible. In some embodiments, the outsole map 200 is invisible, or in other words, unmarked.

In some embodiments, the outsole 102 is universal and comprises a plurality of outsole components 1802 for positioning a protuberance 104 in a plurality of positions in accordance with the position code such that the outsole 102 is not patient specific. In some embodiments, the protuberance 104 is universal. In some embodiments, a universal protuberance 104 and a universal outsole 102 are coupled to produce a patient specific outsole adjustment system.

In some embodiments, protuberance pivot 2 is coupled to one of the anterior rail 204-2 and the posterior rail 410-2. In some embodiments, the anterior rail 204-2 and/or the posterior rail 410-2 is shaped to fix the protuberance 2 on the outsole 102. In some embodiments, the anterior rail 204-2 is placed on one of the points of the anterior outsole map 300 coordinate system. In some embodiments, the anterior rail 204-2 is centered at the anterior origin 17 of the anterior outsole map 300 coordinate system. In some embodiments, the posterior rail 410-2 is placed on one of the points of the posterior outsole map 400 and based on coordinate system. In some embodiments, the anterior rail 410-2 is centered at the posterior origin 25 based on the posterior outsole map 400.

For example, the embodiment depicted by FIG. 18A the outsole 102-2 comprises sockets 1802. In some embodiments, the outsole 102-2 comprises a plurality of outsole components 1802 sockets. In some embodiments, such as depicted by FIG. 18B-C, the protuberance 104 comprises a protuberance component 1804 plug configured to couple to one of the outsole components 1802 sockets.

In some embodiments, and in the embodiment depicted by FIG. 18A-C, coupling the protuberance component 1804-2 is with any one of outsole components 1802 provides six distinct positions of the protuberance 104-2 onto outsole 102-2. In some embodiments, coupling the protuberance component 1804-4 is with any one of outsole components 1802 provides six distinct positions of the protuberance 104-2 onto outsole 102-2. The combination coupling one of the protuberance components 1804-2/1804-4 with the outsole components 1802-2-1802-12 provides 24 distinct alignments of protuberances 104-2/104-3 on the outsole 102-2.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A footwear, comprising:

an outsole having an anterior portion and a posterior portion wherein at least one of said anterior portion and said posterior portion are configured to receive at least one protuberance;

the at least one of said anterior portion and said posterior portion comprising a visible outsole map having a plurality of parallel longitudinal lines;

said at least one protuberance being slidingly and rotatably mounted on said outsole such that the at least one protuberance can be moved to a variety of positions with respect to the visible outsole map and to contact a ground at a protuberance vertex;

wherein said at least one protuberance comprises: (i) a protuberance pivot providing a rotation axis for the at least one protuberance, said rotation axis having an offset position with respect to the protuberance vertex; and (ii) a set of pointers positioned along a circumference of the at least one protuberance;

wherein each of said variety of positions is identifiable with a unique code comprising a pointer identifier representing one pointer of the set of pointers and a longitudinal line identifier representing one longitudinal line of the plurality of parallel longitudinal lines.

2. The footwear according to claim 1, wherein said pointer identifier and said longitudinal line identifier comprise marks of: letters, numbers, or both.

3. The footwear according to claim 1, wherein each pointer of said set of pointers represents an alignment line, said alignment line being colinear with a diameter of said at least one protuberance.

4. The footwear according to claim 3, wherein, for two consecutive pairs of pointers of the set of pointers, an angle between alignment lines of a first pair of the two consecutive pairs differs from an angle between alignment lines of a second pair of the two consecutive pairs.

5. The footwear according to claim 1, wherein said set of pointers comprises at least one pair of collinear pointers, wherein, in a ground-plane projection of the at least one protuberance, pointers of said pair of collinear pointers are located on opposite sides of a virtual line passing through said protuberance vertex and said rotation axis.

6. The footwear according to claim 1, wherein said unique code is indicative of a shift of the protuberance vertex in medial-lateral and anterior-posterior directions.

7. The footwear according to claim 1, wherein the protuberance vertex is concentric with respect to the circumference of the at least one protuberance.

8. The footwear according to claim 1, wherein each position of said variety of positions is defined by an alignment of a specific pointer of the set of pointers with a specific longitudinal line of the plurality of parallel longitudinal lines.

9. The footwear according to claim 1, wherein said at least one protuberance is configured so that, for at least two pairs of positions of said variety of positions, a first position of each pair of positions being defined by alignment of a first pointer of a pair of consecutive pointers taken from the set of pointers with a specific longitudinal line, and a second position of each pair of positions being defined by alignment of a second pointer of the pair of consecutive pointers with the specific longitudinal line, a distance of a shift of the protuberance vertex obtained by moving said at least one protuberance from the first position to the second position is constant.

* * * * *